United States Patent
Ahn et al.

(10) Patent No.: US 7,151,583 B2
(45) Date of Patent: Dec. 19, 2006

(54) LIQUID CRYSTAL DISPLAY DEVICE

(75) Inventors: Byung Chul Ahn, Anyang-shi (KR); Do Sung Kim, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/975,443

(22) Filed: Oct. 29, 2004

(65) Prior Publication Data

US 2005/0062924 A1    Mar. 24, 2005

Related U.S. Application Data

(62) Division of application No. 10/603,766, filed on Jun. 26, 2003.

(30) Foreign Application Priority Data

Aug. 21, 2002   (KR)   ................. 2002-49489

(51) Int. Cl.
*G02F 1/13* (2006.01)
(52) U.S. Cl. ....................................... 349/129
(58) Field of Classification Search ............... 349/129, 349/143, 139, 141
See application file for complete search history.

(56) References Cited

U.S. PATENT DOCUMENTS

| | | | |
|---|---|---|---|
| 4,691,995 A | 9/1987 | Yamazaki et al. | |
| 5,309,264 A | 5/1994 | Lien et al. | |
| 5,608,556 A | 3/1997 | Koma | |
| 5,666,179 A | 9/1997 | Koma | |
| 6,583,836 B1 * | 6/2003 | Kim et al. | 349/129 |
| 6,671,020 B1 * | 12/2003 | Kim et al. | 349/129 |
| 6,839,104 B1 * | 1/2005 | Taniguchi et al. | 349/106 |
| 6,897,929 B1 * | 5/2005 | Takeda et al. | 349/129 |
| 6,903,791 B1 * | 6/2005 | Sasaki | 349/129 |
| 2001/0030726 A1 * | 10/2001 | Yoshida et al. | 349/117 |
| 2003/0112398 A1 * | 6/2003 | Kim et al. | 349/129 |
| 2003/0128312 A1 * | 7/2003 | Lu et al. | 349/110 |
| 2004/0075798 A1 * | 4/2004 | Inoue et al. | 349/129 |
| 2004/0114081 A1 * | 6/2004 | Sawasaki et al. | 349/123 |

FOREIGN PATENT DOCUMENTS

| | | |
|---|---|---|
| EP | 0 884 626 A2 | 12/1998 |
| JP | 6-235925 | 8/1994 |

(Continued)

OTHER PUBLICATIONS

Y. Tanaka et al.; "A New Design to Improve Performance and Simplify the Manufacturing Process of High-Quality MVA TFT-LCD Panels"; SID '99 Digest; pp. 206-209.

*Primary Examiner*—Toan Ton
(74) *Attorney, Agent, or Firm*—McKenna Long & Aldridge LLP

(57) ABSTRACT

A liquid crystal display (LCD) device is disclosed, which obtains a wide viewing angle without gray inversion, stabilizes alignment of liquid crystal layer, and obtains high aperture ratio. The LCD device includes first and second substrates; gate and data lines crossing each other on the first substrate to define a pixel region; a pixel electrode in the pixel region; electric field inducing windows in respective one of two regions of the pixel region; a common auxiliary electrode corresponding to the electric field inducing window of the pixel electrode; a common electrode on the second substrate; a dielectric protrusion on the common electrode corresponding to the periphery of the pixel electrode, and a liquid crystal layer between the first and second substrates.

17 Claims, 27 Drawing Sheets

FOREIGN PATENT DOCUMENTS

| | | |
|---|---|---|
| JP | 8-101395 | 4/1996 |
| JP | 9-61829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |
| KR | 10-2000-0056253 | 9/2000 |
| WO | WO 00/08521 | 2/2000 |

* cited by examiner

C/R>10

Angle = 0°

Angle = 45°

Angle = 90°

Angle = 135°

Angle = 0°

Angle = 45°

Angle = 90°

Angle = 135°

LIQUID CRYSTAL DISPLAY DEVICE

This application is a divisional of prior application Ser. No. 10/603,766, filed Jun. 26, 2003.

This application claims the benefit of the Korean Application No. P2002-49489 filed on Aug. 21, 2002, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device obtaining a stable liquid crystal alignment, wide viewing angle in left and right directions, and high aperture ratio.

2. Discussion of the Related Art

With the development of the information society, demands for various display devices have increased. Accordingly, many efforts have been made to research and develop various flat display devices such as liquid crystal display (LCD), plasma display panel (PDP), electroluminescent display (ELD), and vacuum fluorescent display (VFD). Some types of the flat display devices are already applied to displays of various equipments.

Among the various flat display devices, the liquid crystal display (LCD) device has been most widely used due to advantageous characteristics of thinness, lightness in weight, and low power consumption. In many cases, the LCD device substitutes for Cathode Ray Tube (CRT). In addition to the mobile type LCD devices, such as a display for a notebook computer, LCD devices have been developed for computer monitors and televisions to receive and display broadcasting signals.

Despite various technical developments in the LCD technology with applications in different fields, research in enhancing the picture quality of the LCD device has been in some respects lacking as compared to other features and advantages of the LCD device. Therefore, in order to use the LCD device in various fields as a general display, the key to developing the LCD device lies on whether the LCD device can implement a high quality picture, such as high resolution and high luminance with a large-sized screen while still maintaining lightness in weight, thinness, and low power consumption.

The LCD device includes an LCD panel for displaying a picture image and a driving part for applying a driving signal to the LCD panel. The LCD panel includes lower and upper substrates bonded to each other at a predetermined interval, and a liquid crystal layer between the lower and upper substrates. The liquid crystal layer is driven by an electric field generated between the lower and upper substrates, thereby controlling a light transmittance by the liquid crystal layer. As a result, the picture image is displayed on the LCD panel.

Among the LCD devices, a Twisted Nematic (TN) mode LCD device has been most generally used. The TN mode LCD device has characteristics of varying the transmittance of light at each gray level in accordance with a corresponding viewing angle. Specifically, the transmittance of light is distributed symmetrically in right and left directions of the TN mode LCD device, but asymmetrically in lower and upper directions, whereby gray inversion is generated. In order to overcome such a problem, a method is proposed to compensate for the variation of light transmittance in accordance with a corresponding viewing angle by dividing a domain by differentiating an alignment direction of the liquid crystal layer in a pixel region.

A related art LCD device will be explained with reference to the accompanying drawings. FIG. 1 is a plan view illustrating a unit pixel of a related art LCD device, and FIG. 2 is a cross-sectional view taken along line I–I' of FIG. 1.

The related art LCD device includes lower and upper substrates 1 and 10 facing each other, and a liquid crystal layer 16 between the lower and upper substrates 1 and 10.

The lower substrate 1 includes a plurality of gate and data lines 2 and 4 crossing another to define a plurality of pixel regions, a gate electrode 2a extended from both sides of the gate line 2, a gate insulating layer (not shown) on the lower substrate 1 including the gate line 2, an active region 3 on the gate insulating layer above the gate electrode 2a, a pixel electrode 7 in the pixel region at the same layer as the active region, a source electrode 4a extended from the data line 4 for being overlapped with one portion of the active region 3, a drain electrode 4b being apart from the source electrode 4a for being overlapped with another portion of the active region 3 and a predetermined portion of the pixel electrode 7, an interlayer passivation film 6 on an entire surface of the lower substrate including the pixel electrode 7, an alignment control electrode 5 on the interlayer passivation film 6 for being overlapped with the periphery of the pixel electrode 7, and a first alignment layer 8 on the lower substrate 1 including the alignment control electrode 5.

The upper substrate 10 includes a black matrix layer (not shown), a color filter layer (not shown) on the upper substrate 10 corresponding to the black matrix layer of the upper substrate 10 and the pixel regions of the lower substrate 1, a common electrode 13 on the color filter layer, the common electrode 13 having an X-shaped alignment control window 14, and a second alignment layer 15 on the upper substrate 10 including the common electrode 13. Then, the liquid crystal layer 16 is formed between the lower and upper substrates 1 and 10.

In the related art LCD device, when an electric field is generated between the pixel electrode 7 of the lower substrate 1 and the common electrode 13 of the upper substrate 10, as shown in an arrow of FIG. 2, a fringe field is generated by the alignment control window 14 inside the common electrode 13. Thus, liquid crystal molecules are differently aligned at both sides of the alignment control window 14 by the fringe field, thereby compensating a viewing angle.

However, the related art LCD device has the following disadvantages.

In the related art LCD device, the alignment control electrode 5 is formed of a metal material through which light does not pass, and the alignment control electrode 5 is spaced apart from the data line 4 by a predetermined interval to prevent a short between the alignment control electrode 5 from the data line 4 so that a width of the pixel region is decreased, thereby decreasing aperture ratio and luminance. In order to apply the related art LCD device to manufacturing, brightness of a backlight must be increased, whereby power consumption increases.

The aforementioned related art relates to a vertical alignment (VA) mode LCD device. In case of the TN mode LCD device, the electric field is generated such that the electric field faces outwardly in the periphery-of the pixel, so that the alignment of the liquid crystal is unstable. Accordingly, a light leakage is generated in the periphery of the pixel, thereby decreasing contrast ratio. Furthermore, the alignment of the liquid crystal becomes unstable even in a light touch, thereby generating a spot. Also, it is difficult to recover from the spot since a response time is slow.

SUMMARY OF THE INVENTION

Accordingly, the present invention is directed to a liquid crystal display (LCD) device that substantially obviates one or more problems due to limitations and disadvantages of the related art.

An advantage of the present invention is to provide an LCD device having a wide viewing angle.

Another advantage of the present invention is to provide an LCD device having no gray inversion.

Another advantage of the present invention is to provide an LCD device, in which alignment of liquid crystal is stable, thereby obtaining high aperture ratio.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device includes first and second substrates; gate and data lines crossing each other on the first substrate to define a pixel region; a pixel electrode in the pixel region; at least two electric field inducing windows in at least divided two regions of the pixel region; a common auxiliary electrode corresponding to the electric field inducing window of the pixel electrode; a common electrode on the second substrate; a dielectric protrusion on the common electrode corresponding to the periphery of the pixel electrode, and each boundary for dividing the pixel region into at least two regions; and a liquid crystal layer between the first and second substrates, the liquid crystal layer having no dopant.

In another aspect of the present invention an LCD device includes first and second substrates; gate and data lines crossing each other on the first substrate to define a pixel region; a common auxiliary electrode in the pixel region corresponding the periphery of the pixel region and each boundary for dividing the pixel region into at least two regions; a pixel electrode in the pixel region; a common electrode on the second substrate; at least two dielectric protrusions on the common electrode in respective regions of the pixel region; and a liquid crystal layer between the first and second substrates, the liquid crystal layer having no dopant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

In the embodiments of the present invention, a unit pixel is divided into multi-domains, and liquid crystal is rotated in the respective domains according to a direction of an electric field. For this, liquid crystal having a positive dielectric anisotropy is used, and a dopant is not added thereto. At this time, an elastic coefficient of the aforementioned liquid crystal is greater at 10% than liquid crystal having a positive dielectric anisotropy. In addition, in examples set forth herein, a pre-tilt angle of an alignment layer is 1° or less.

In a unit pixel region, an alignment direction is set according to a splay method, or to about 0° or about 90°. At least two slits (hereinafter, referred to as an electric field inducing window) are formed horizontally, vertically or diagonally in a pixel electrode or an upper substrate. Also, a common auxiliary electrode is formed below the electric field inducing window or in the periphery of the pixel electrode to control the direction of the electric field. Furthermore, a dielectric protrusion or electric field inducing window is formed on an upper substrate (color filter substrate) to reinforce the direction of the electric field induced by the lower substrate.

The LCD device according to the embodiment of the present invention will be described with reference to the accompanying drawings in which the unit pixel region is divided into four domains.

First Embodiment

Figure 1:
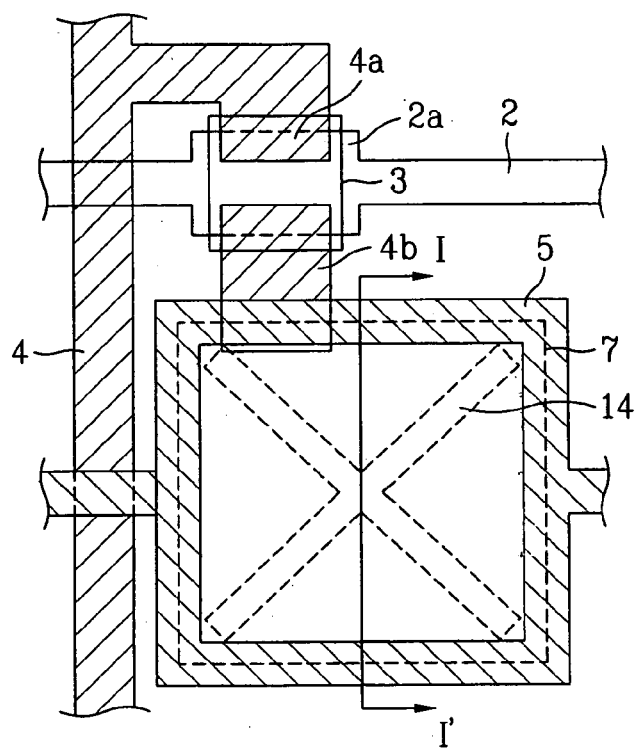
FIG. 1 is an enlarged plan view illustrating a unit pixel of an LCD device according to the related art.
Figure 2:
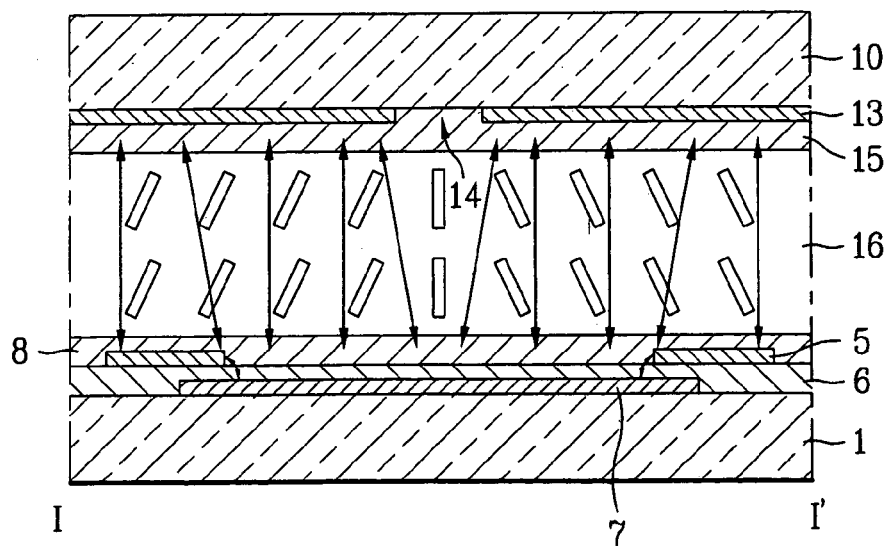
FIG. 2 is a cross-sectional view taken along line I–I' of FIG. 1.
Figure 3:
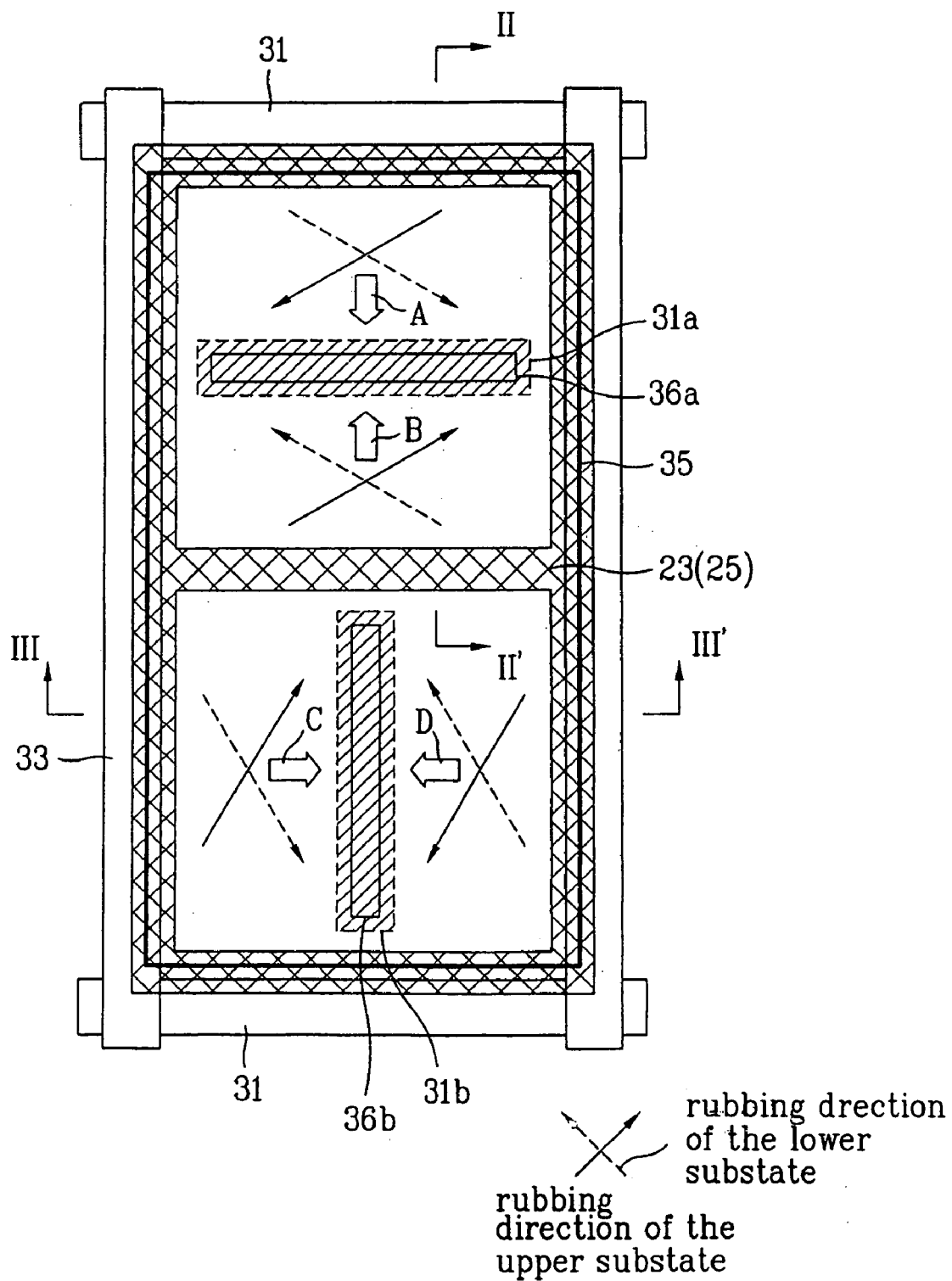
FIG. 3 is an enlarged plan view illustrating a unit pixel of an LCD device according to the first embodiment of the present invention.
Figure 4:
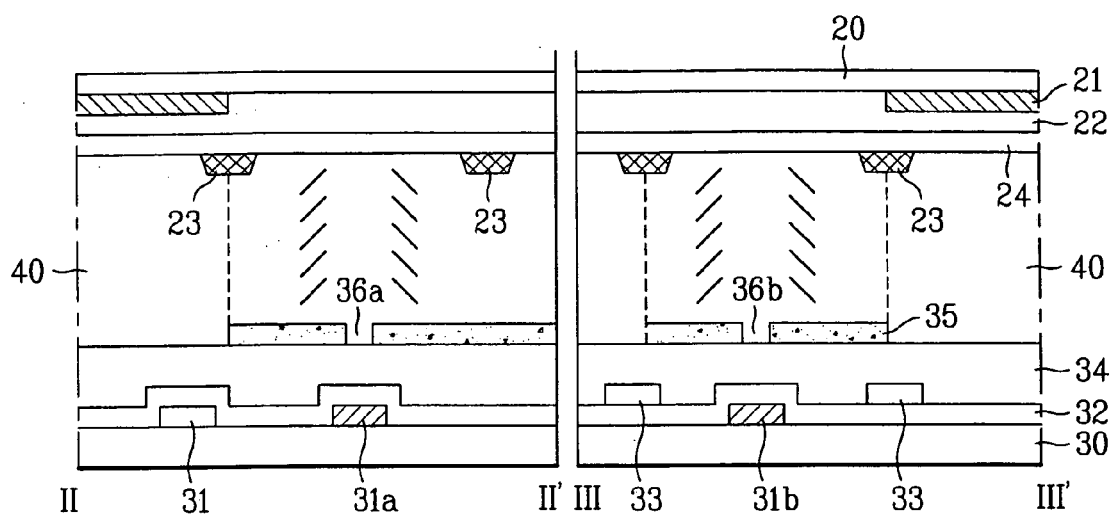
FIG. 4 is a cross-sectional view illustrating a unit pixel of an LCD device taken along lines II–II' and III–III' of FIG. 3 according to one structure of the first embodiment of the present invention.
Figure 5:
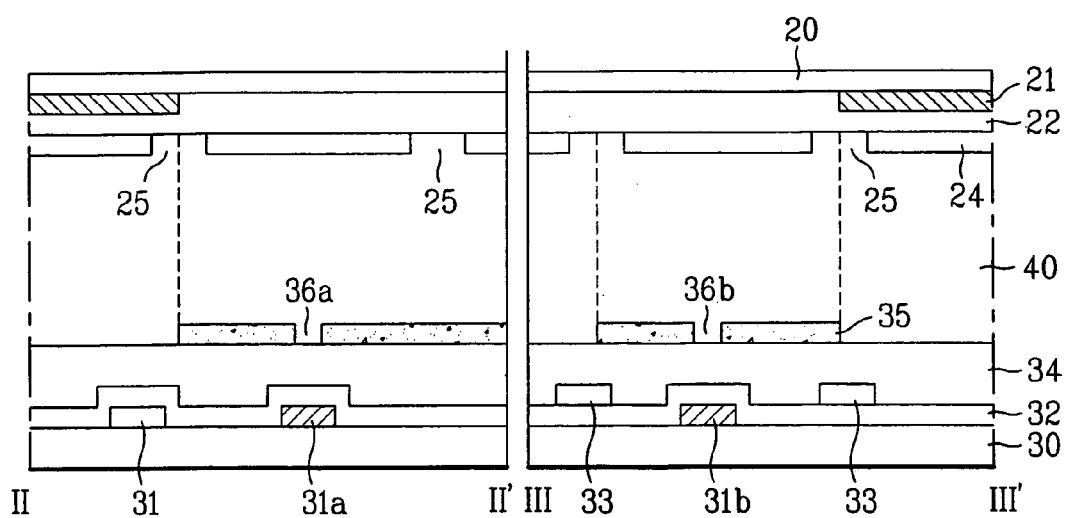
FIG. 5 is a cross-sectional view illustrating a unit pixel of an LCD device taken along lines II–II' and III–III' of FIG. 3 according to another structure of the first embodiment of the present invention.

FIG. 3 is an enlarged plan view illustrating a unit pixel of an LCD device according to the first embodiment of the present invention. FIG. 4 is a cross-sectional view illustrating a unit pixel of an LCD device taken along lines II–II' and III–III' of FIG. 3 according to one structure of the first embodiment of the present invention. FIG. 5 is a cross-sectional view illustrating a unit pixel of an LCD device taken along lines II–II' and III–III' of FIG. 3 according to another structure of the first embodiment of the present invention.

As illustrated in FIG. 3 and FIG. 4, the LCD device according to the first embodiment of the present invention includes lower and upper substrates 30 and 20 facing each other, a plurality of gate and data lines 31 and 33, a thin film transistor (not shown), first and second common auxiliary electrodes 31a and 31b, a gate insulating layer 32, a passivation layer 34, a pixel electrode 35, a black matrix layer 21, a color filter layer 22, a common electrode 24, a dielectric protrusion 23, and a liquid crystal layer 40.

On the lower substrate 30, the plurality of gate and data lines 31 and 33 are formed to cross each other for defining a plurality of pixel regions, and the thin film transistor (not shown) is formed at a crossing point of the gate and data lines 31 and 33. Then, the first and second common auxiliary electrodes 31a and 31b are formed at the same layer as the gate or data line 31 and 33, which are respectively formed for being substantially parallel and substantially perpendicular to the gate line 31 in two regions of the unit pixel region. The gate insulating layer 32 is formed on an entire surface of the lower substrate 30 including the gate line 31 and the first and second common auxiliary electrodes 31a and 31b, and the passivation layer 34 is formed on the entire surface of the lower substrate 30 including the data line 33. Also, the pixel electrode 35 is formed on the passivation layer 34 corresponding to the pixel region for being connected to the thin film transistor, the pixel electrode 35 having first and second electric field inducing windows 36a and 36b respectively corresponding to the first and second common auxiliary electrodes 31a and 3b.

Next, the black matrix layer 21 is formed on the upper substrate 20 corresponding to regions except the pixel region of the lower substrate 30, and the color filter layer 22 is formed on the upper substrate 20 corresponding to the pixel region of the lower substrate 30 for being partially overlapped with the black matrix layer 21. Then, the common electrode 24 is formed on an entire surface of the upper substrate 20 including the color filter layer 22, and the dielectric protrusion 23 is formed on the common electrode 24 corresponding to the periphery of the pixel electrode and a boundary dividing the unit pixel region into the two regions. After that, the liquid crystal layer 40 is provided between the lower and upper substrates 30 and 20.

In the aforementioned structure of the LCD device, as illustrated in FIG. 5, an electric field inducing window 25 may be formed in the common electrode 24 instead of the dielectric protrusion 23 on the common electrode 24 of the upper substrate 20. Although not shown, an overcoat layer may be additionally formed on the color filter layer 22 for protecting the color filter layer 22. Referring to FIG. 3 and FIG. 5, the dielectric protrusion 23 or the electric field inducing window 25 is formed on the common electrode 24 or in the common electrode 24 for being partially overlapped with the periphery of the pixel electrode 35.

As illustrated in FIG. 3 showing the plan view of the unit pixel region, the unit pixel region is divided into upper and lower regions by the dielectric protrusion 23 or the electric field inducing window 25. Also, the upper region is divided into first and second domains according to the first electric field inducing window 36a, and the lower region is divided into third and fourth domains according to the second electric field inducing window 36b. As a result, the unit pixel region is divided into the multi-domains according to the first and second electric field inducing windows 36a and 36b, whereby a wide viewing angle is obtained since different alignment directions are formed in the multi-domains of the unit pixel region.

That is, the unit pixel region is divided into the two domains. Then, one of the regions is divided into the two domains by the first electric field inducing window 36a horizontally formed in the unit pixel region. At this time, the divided two domains are symmetrical in lower and upper directions. In addition, the other region is divided by the second electric field inducing window 36b that is substantially perpendicular to the gate line 31 in the unit pixel region, whereby the two domains are formed symmetrically in left and right directions. As a result, the four domains are formed in the unit pixel region.

The dielectric protrusion 23 or the electric field inducing window 25 is formed on the upper substrate 20 to reinforce a direction of an electric field induced by the lower substrate 30. Also, the first and second common auxiliary electrodes 31a and 31b disposed below the first and second electric field inducing windows 36a and 36b reinforce a fringe field, whereby the direction of the electric field faces inward in the pixel region.

In case of that rubbing directions of the lower and upper substrates 30 and 20 are formed in a splay method, as illustrated in FIG. 3, the direction of the liquid crystal faces inward in the respective regions of the unit pixel region toward the first and second electric field inducing windows 36a and 36b, as indicated by arrows of FIG. 3. Also, as mentioned above, the first and second common auxiliary electrodes 31a and 31b may be formed during the process forming the gate line 31 or the data line 33, whereby the manufacturing process is simplified.

FIG. 4 shows that the first and second common auxiliary electrodes 31a and 31b may be formed with the gate line 31 at the same time. The pixel electrode 35 may be formed for being overlapped with the data line 33 at a predetermined portion, thereby improving aperture ratio. In this case, the passivation layer 34 is formed between the pixel electrode 35 and the data line 33 to prevent signal interference between the pixel electrode 35 and the data line 33. The passivation layer 34 may be formed of an organic insulating layer having a low dielectric constant such as Benzocyclobutene (BCB) or photo-acryl. Also, in case of that the predetermined portion of the data line 33 is overlapped with the pixel electrode 35, the black matrix layer 21 is formed on the remaining portion of the data line 33 that is not overlapped with the pixel electrode 35, whereby the aperture ratio is improved.

It will be apparent to those skilled in the art that various modifications and variations of the gate line 31, the data line 33, the gate insulating layer 32, the black matrix layer 21 and the color filter layer 22 can be made in the present invention. Thus, it is intended that the present invention covers the modifications and variations of this invention provided they come within the scope of the appended claims and their equivalents.

An alignment layer is formed on the entire surface of at least one of the lower and upper substrates 30 and 20 for an initial alignment of the liquid crystal layer. At this time, the alignment layer may be formed of polyamide or polyimide group compound material, polyvinylalcohol (PVA), or polyamic acid with rubbing. Or, the alignment layer may be formed of any material having photoreaction group such as polyvinylcinnamate (PVCN), polysiloxanecinnamate (PSCN) or cellulosecinnamate (CelCN) with light (i.e., photoalignment). In this state, the pretilt angle and alignment direction are simultaneously determined by photo irradiation process step at least one time. Ultraviolet rays of unpolarized light, non-polarized light, linearly polarized light or partially polarized light may be used.

More particularly, the pretilt angle of the alignment layer is about 0°, and the lower and upper substrates are aligned or rubbed in the splay method. Also, in this embodiment of the present invention, dopant is not added to the liquid crystal layer, whereby the liquid crystal is rotated at the same direction as the electric field. That is, the rotation direction of the liquid crystal is determined according to a voltage applied to the first and second common auxiliary electrodes 31a and 31b because dopant is not added to the liquid crystal layer. The dopant would influence the rotation direction of the liquid crystal.

Hereinafter, the rotation direction of the liquid crystal will be described in detail.

In the first domain of the pixel region, the direction of the electric field inwardly faces the first common auxiliary electrode 31a (arrow A of FIG. 3). In this state, when a voltage is applied to the first common auxiliary electrode 31a, the liquid crystal molecules that are substantially parallel to the lower and upper substrates become substantially perpendicular to the lower and upper substrates. At this time, the liquid crystal molecules are rotated clockwise from a direction of four o'clock, so that the liquid crystal molecules are generally arranged in a direction of six o'clock.

In the second domain of the pixel region, the direction of the electric field inwardly faces the first common auxiliary electrode 31a (arrow B of FIG. 3). In this state, when the voltage is applied to the first common auxiliary electrode 31a, the liquid crystal molecules that are substantially parallel to the lower and upper substrates become substantially perpendicular to the lower and upper substrates. At this time, the liquid crystal molecules are rotated clockwise from a direction of ten o'clock, so that the liquid crystal molecules are generally arranged in a direction of twelve o'clock.

In the third domain of the pixel region, the direction of the electric field inwardly faces the second common auxiliary electrode 31b (arrow C of FIG. 3). In this state, when the voltage is applied to the second common auxiliary electrode 31b, the liquid crystal molecules that are substantially parallel to the lower and upper substrate become substantially perpendicular to the lower and upper substrates. At this time, the liquid crystal molecules are rotated counterclockwise from a direction of four o'clock, whereby the liquid crystal molecules are generally arranged in a direction of three o'clock.

In the fourth domain of the pixel region, the direction of the electric field inwardly faces the second common auxiliary electrode 31b (arrow D of FIG. 3). In this state, when the voltage is applied to the second common auxiliary electrode 31b, the liquid crystal molecules that are substantially parallel to the lower and upper substrates become substantially perpendicular to the lower and upper substrates. At this time, the liquid crystal molecules are rotated counterclockwise from a direction of ten o'clock, whereby the liquid crystal molecules are generally arranged in a direction of nine o'clock.

As mentioned above, the unit pixel region is divided into the four domains by distortion of the electric field. Thus, it is possible to compensate phase difference by the light transmittance in the unit pixel region, thereby preventing gray inversion and obtaining symmetrical viewing angle. The aforementioned structure has the aperture ratio of 70% or more as compared to a general TN mode LCD device.

In the LCD device according to the first embodiment of the present invention, as illustrated in FIG. 3, the direction of the liquid crystal molecules generally faces the first and second electric field inducing windows 36a and 36b in the same direction as the electric field.

Second Embodiment

FIG. 6 to FIG. 11 are enlarged plan views illustrating a unit pixel of an LCD device according to various structures of the second embodiment of the present invention. In the LCD device according to the second embodiment of the present invention, a unit pixel region is divided into eight domains, whereby the whole region of the unit pixel region is uniformly influenced by electric field intensity. The LCD device according to the second embodiment of the present invention has the same structure as that of the LCD device according to the first embodiment of the present invention, except that the number of electric field inducing windows, the number of common auxiliary electrodes, and the shapes of the electric field inducing window and dielectric protrusion may be different from those of the first embodiment.

As illustrated in FIG. 6 to FIG. 11, and FIG. 4 illustrating the cross-sectional view according to the first embodiment of the present invention, the LCD device according to the second embodiment of the present invent includes lower and upper substrates 30 and 20 facing each other at a fixed interval, a plurality of gate and data lines 31 and 33, a thin film transistor (not shown), first to fourth common auxiliary electrodes 31a, 31b, 31c and 31d, a gate insulating layer 32, a passivation layer 34, a pixel electrode 35, a black matrix layer 21, a color filter layer 22, a common electrode 24, a dielectric protrusion 23 and a liquid crystal layer 40.

On the lower substrate 30, the plurality of gate and data lines 31 and 33 are formed to cross to each other for defining a plurality of pixel regions, and the thin film transistor (not shown) is formed at a crossing point of the gate and data lines 31 and 33. Then, the first to fourth common auxiliary electrodes 31a to 31d are formed at the same layer as the gate or data line 31 or 33, of which two are respectively formed in two regions of the unit pixel region for being horizontal to the gate line, and the other two are respectively formed in the other two regions of the pixel region for being vertical to the gate line without regard to the order of the regions. The gate insulating layer 32 is formed on an entire surface of the lower substrate 30 including the gate line 31 and the first to fourth common auxiliary electrodes 31a to 31d, and the passivation layer 34 is formed on the entire surface of the lower substrate 30 including the data line 33. Also, the pixel electrode 35 is formed on the passivation layer 34 corresponding to the pixel region for being connected to the thin film transistor, the pixel electrode 35 having first to fourth electric field inducing windows 36a and 36d respectively corresponding to the first and fourth common auxiliary electrodes 31a and 31d.

Next, the black matrix layer 21 is formed on the upper substrate 20 corresponding to regions except the pixel region of the lower substrate 30, and the color filter layer 22 is formed on the upper substrate 20 corresponding to the pixel region of the lower substrate 30 for being partially overlapped with the black matrix layer 21. The common electrode 24 is formed on an entire surface of the upper substrate 20 including the color filter layer. Also, the dielectric protrusion 23 is formed on the common electrode 24 corresponding to the periphery of the pixel electrode 35 and a boundary between the divided regions in the unit pixel region for dividing the unit pixel region into four regions. After that, the liquid crystal layer 40 is provided between the lower and upper substrates 30 and 20.

In the aforementioned structure of the LCD device, as illustrated in FIG. 5, an electric field inducing window 25 may be formed in the common electrode 24 instead of the dielectric protrusion 23 on the common electrode 24 of the upper substrate 20. At this time, an overcoat layer (not shown) may be additionally formed on the color filter layer 22 for protecting the color filter layer 22. The dielectric protrusion 23 or the electric field inducing window 25 may be partially overlapped with the periphery of the pixel electrode 35.

Figure 6:
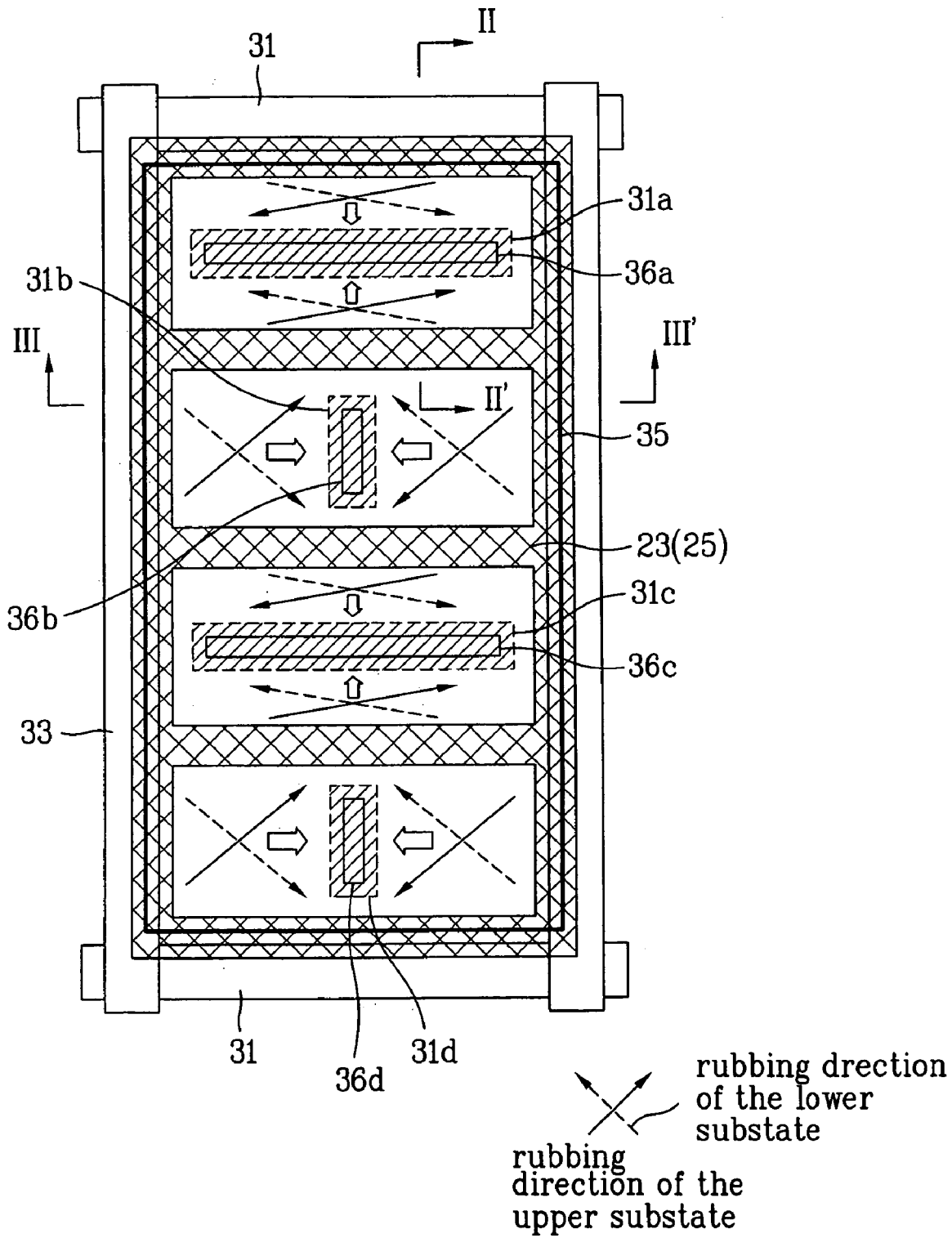
FIG. 6 to FIG. 11 are enlarged plan views illustrating a unit pixel of an LCD device according to various structures of the second embodiment of the present invention.

As illustrated in FIG. 6 showing the plan view of the unit pixel, the unit pixel region may be divided into the four regions by the dielectric protrusion 23 or the electric field inducing window 25. The first to fourth electric field inducing windows 36a, 36b, 36c and 36d are respectively formed in the four regions divided by the dielectric field 23 or the electric field inducing window 25, thereby dividing the unit pixel region into eight domains. At this time, the two of the electric field inducing windows are formed substantially perpendicular to the gate line 31, and the other two are formed substantially parallel to the gate line 31.

Figure 7:
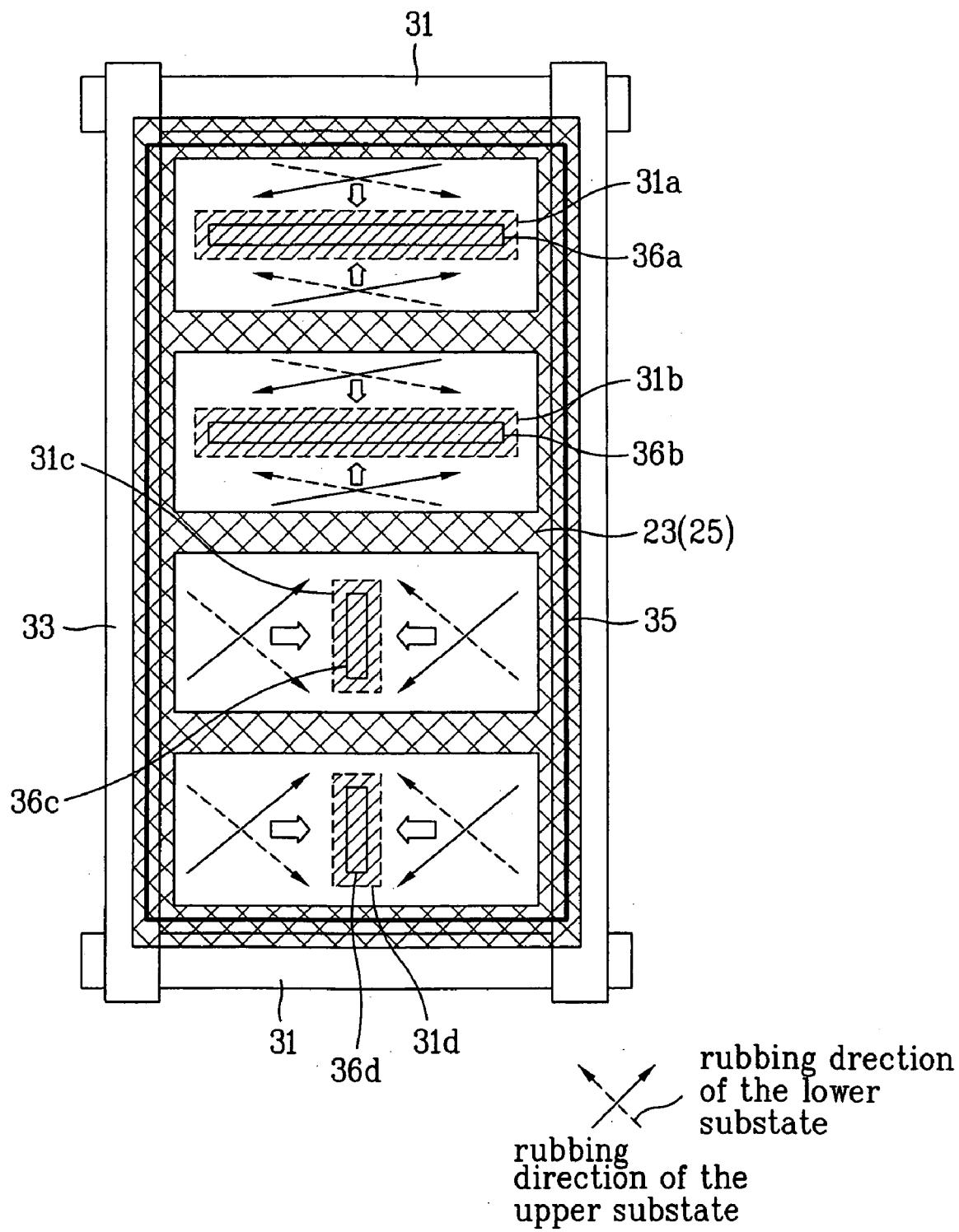

For example, as illustrated in FIG. 6, the first and third electric field inducing windows 36a and 36c may be formed substantially parallel to the gate line 31 in the first and third regions of the unit pixel region, and the second and fourth electric field inducing windows 36b and 36d may be formed substantially perpendicular to the gate line 31 in the second and fourth regions of the unit pixel region. In another example as illustrated in FIG. 7, the first and second electric field inducing windows 36a and 36b may be formed substantially parallel to the gate line 31 in the first and second regions of the unit pixel region, and the third and fourth electric field inducing windows 36c and 36d may be formed substantially perpendicular to the gate line 31 in the third and fourth regions of the unit pixel region. In the example illustrated in FIG. 8, the first and fourth electric field inducing windows 36a and 36d may be formed substantially parallel to the gate line 31 in the first and fourth regions of the unit pixel region, and the second and third electric field inducing windows 36b and 36c may be formed substantially perpendicular to the gate line 31 in the second and third regions of the unit pixel region. In the example illustrated in FIG. 9, the first and fourth electric field inducing windows 36a and 36d may be formed substantially perpendicular to the gate line 31 in the first and fourth regions of the unit pixel region, and the second and third electric field inducing windows 36b and 36c may be formed substantially parallel to the gate line 31 in the second and third regions of the unit pixel region. As illustrated in the example in FIG. 10, the first and third electric field inducing windows 36a and 36c may be formed substantially perpendicular to the gate line 31 in the first and third regions of the unit pixel region, and the second and fourth electric field inducing windows 36b and 36d may be formed substantially parallel to the gate line 31 in the second and fourth regions of the unit pixel region. As illustrated in the example in FIG. 11, the first and second electric field inducing windows 36a and 36b may be formed substantially perpendicular to the gate line 31 in the first and second regions of the unit pixel region, and the third and fourth electric field inducing windows 36c and 36d may be formed substantially parallel to the gate line 31 in the third and fourth regions of the unit pixel region.

In other words, as illustrated in FIG. 6, the first and third regions of the unit pixel region respectively may have the first and third electric field inducing windows 36a and 36c formed substantially parallel to the gate line 31 in the unit pixel region, whereby the first and third regions have respective symmetrical structures in lower and upper directions according to the first and third electric field inducing windows 36a and 36c. Also, the second and fourth regions of the unit pixel region respectively may have the second and fourth electric field inducing windows 36b and 36d formed substantially perpendicular to the gate line 31 in the unit pixel region, whereby the second and fourth regions have respective symmetrical structures in left and right directions according to the second and fourth electric field inducing windows 36b and 36d. As a result, the first to fourth regions are formed in the unit pixel region.

In FIG. 7, the first and second regions of the unit pixel region respectively may have the first and second electric field inducing windows 36a and 36b formed substantially parallel to the gate line 31 in the unit pixel region, whereby the first and second regions have respective symmetrical structures in lower and upper directions according to the first and second electric field inducing windows 36a and 36b. Also, the third and fourth regions of the unit pixel region respectively may have the third and fourth electric field inducing windows 36c and 36d formed substantially perpendicular to the gate line 31 in the unit pixel region, whereby the third and fourth regions have respective symmetrical structures in left and right directions according to the third and fourth electric field inducing windows 36c and 36d. As a result, the first to fourth regions are formed in the unit pixel region.

Figure 8:
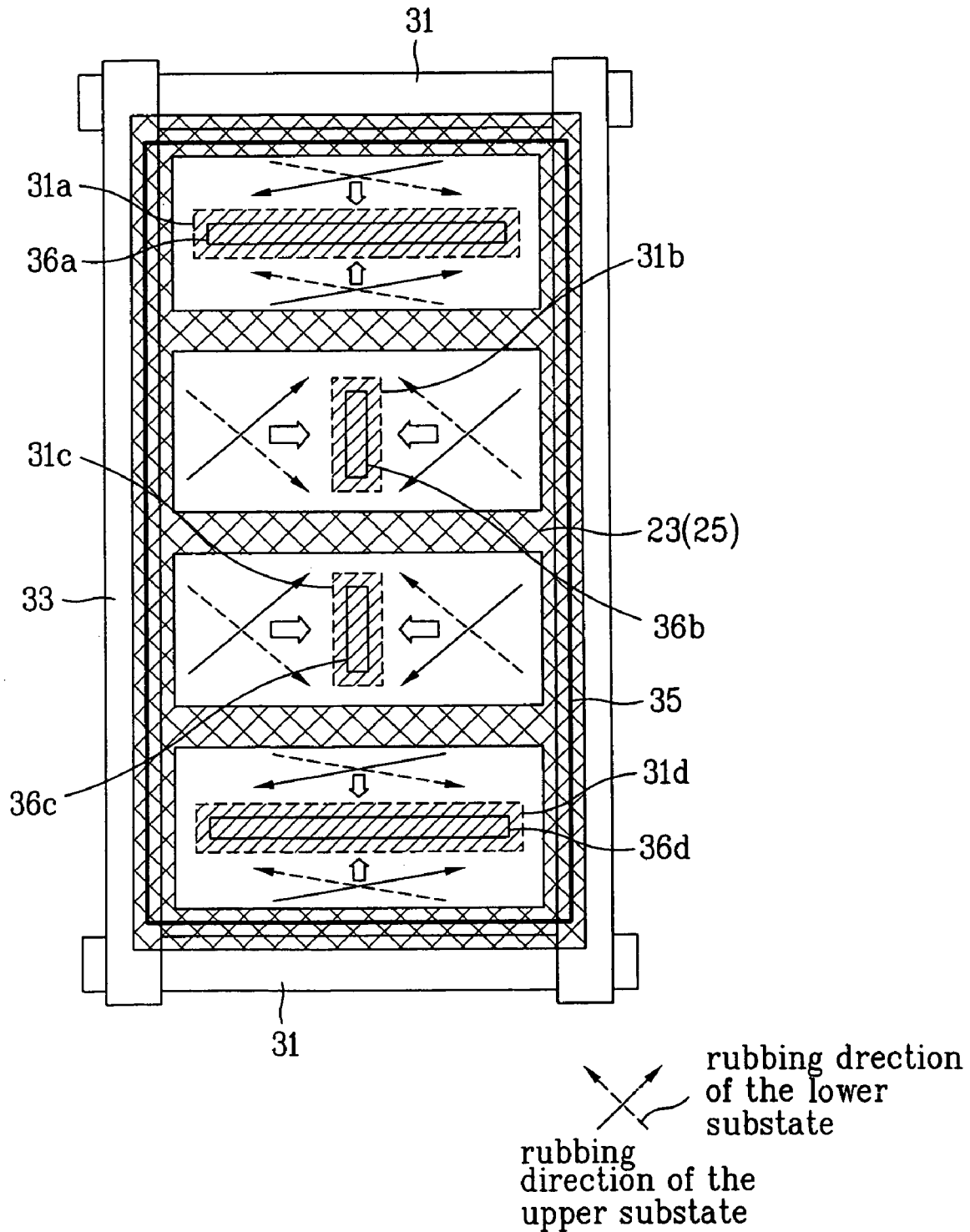

As illustrated in FIG. 8, the first and fourth regions of the unit pixel region respectively may have the first and fourth electric field inducing windows 36a and 36d formed substantially parallel to the gate line 31 in the unit pixel region, whereby the first and fourth regions have respective symmetrical structures in lower and upper directions according to the first and fourth electric field inducing windows 36a and 36d. Also, the second and third regions of the unit pixel region respectively may have the second and third electric field inducing windows 36b and 36c formed substantially perpendicular to the gate line 31 in the unit pixel region, whereby the second and third regions have respective symmetrical structures in left and right directions according to the second and third electric field inducing windows 36b and 36c. As a result, the first to fourth regions are formed in the unit pixel region.

Figure 9:
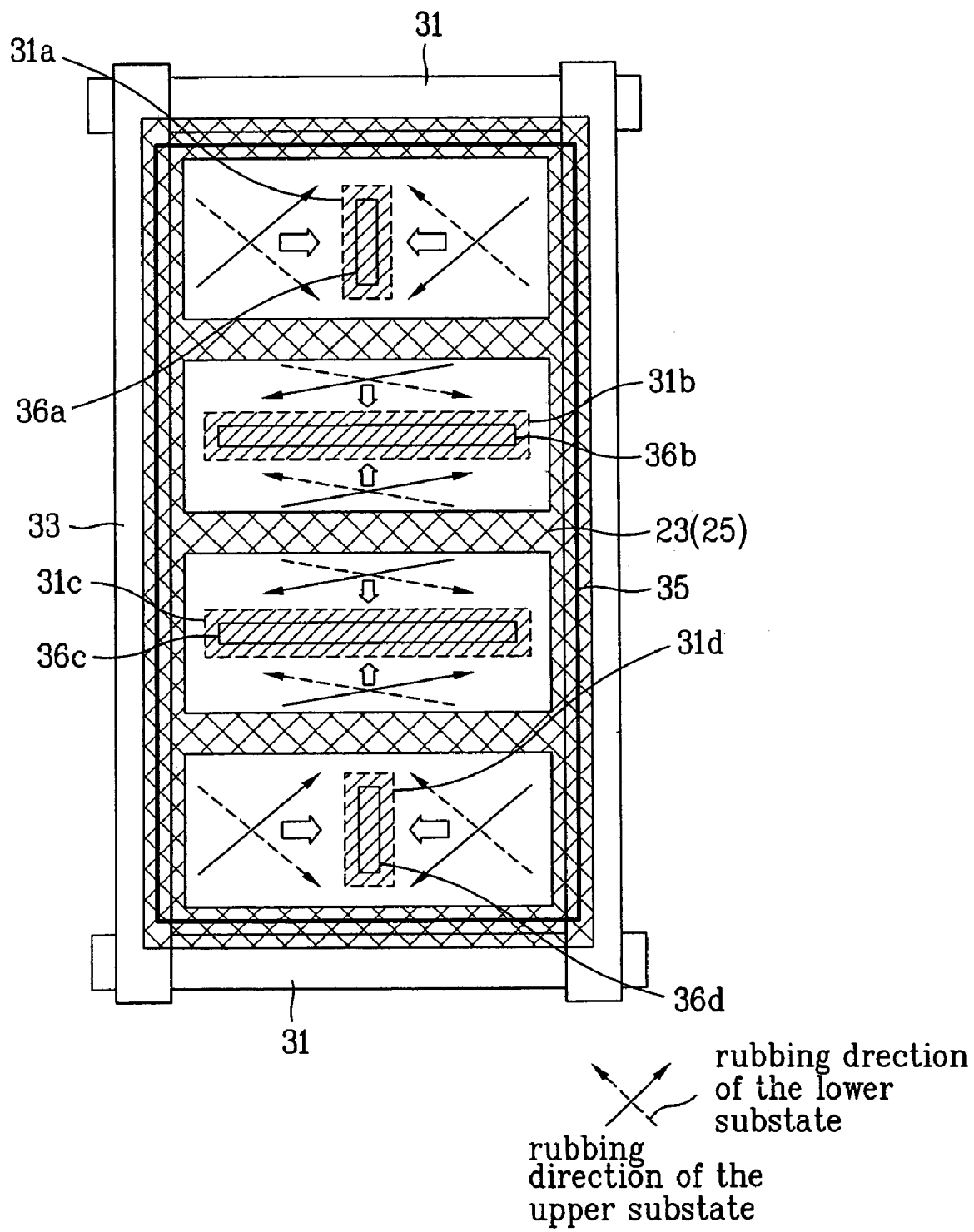

As illustrated in FIG. 9, the first and fourth regions of the unit pixel region respectively may have the first and fourth electric field inducing windows 36a and 36d formed substantially perpendicular to the gate line 31 in the unit pixel region, whereby the first and fourth regions have respective symmetrical structures in left and right directions according to the first and fourth electric field inducing windows 36a and 36d. Also, the second and third regions of the unit pixel region respectively may have the second and third electric field inducing windows 36b and 36c formed substantially parallel to the gate line 31 in the unit pixel region, whereby the second and third regions have respective symmetrical structures in lower and upper directions according to the second and third electric field inducing windows 36b and 36c. As a result, the first to fourth regions are formed in the unit pixel region.

Figure 10:
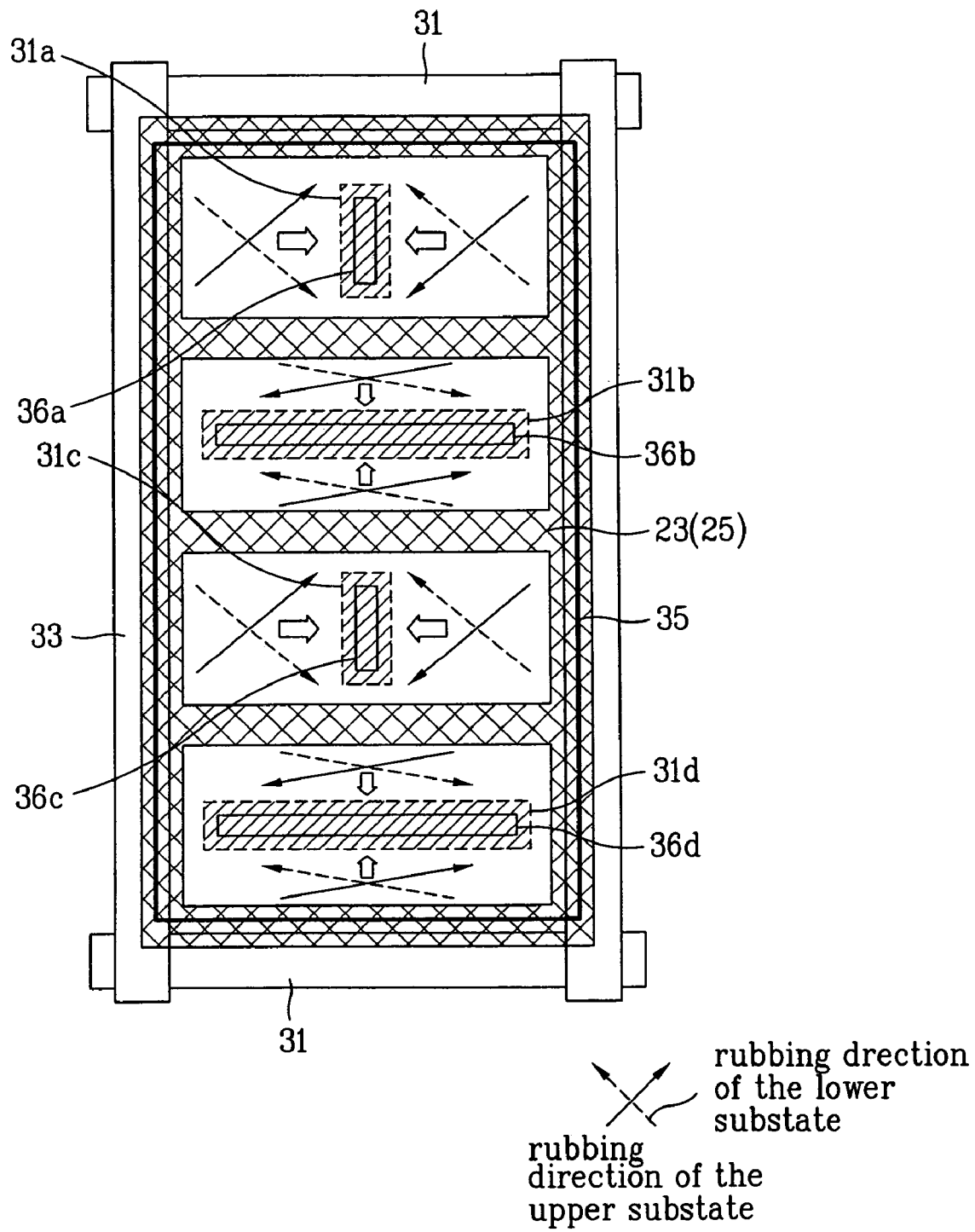

As illustrated in FIG. 10, the first and third regions of the unit pixel region respectively may have the first and third electric field inducing windows 36a and 36c formed substantially perpendicular to the gate line 31 in the unit pixel region, whereby the first and third regions have respective symmetrical structures in left and right directions according to the first and third electric field inducing windows 36a and 36c. Also, the second and fourth regions of the unit pixel region respectively may have the second and fourth electric field inducing windows 36b and 36d formed substantially parallel to the gate line 31 in the unit pixel region, whereby the second and fourth regions have respective symmetrical structures in lower and upper directions according to the second and fourth electric field inducing windows 36b and 36d. As a result, the first to fourth regions are formed in the unit pixel region.

Figure 11:
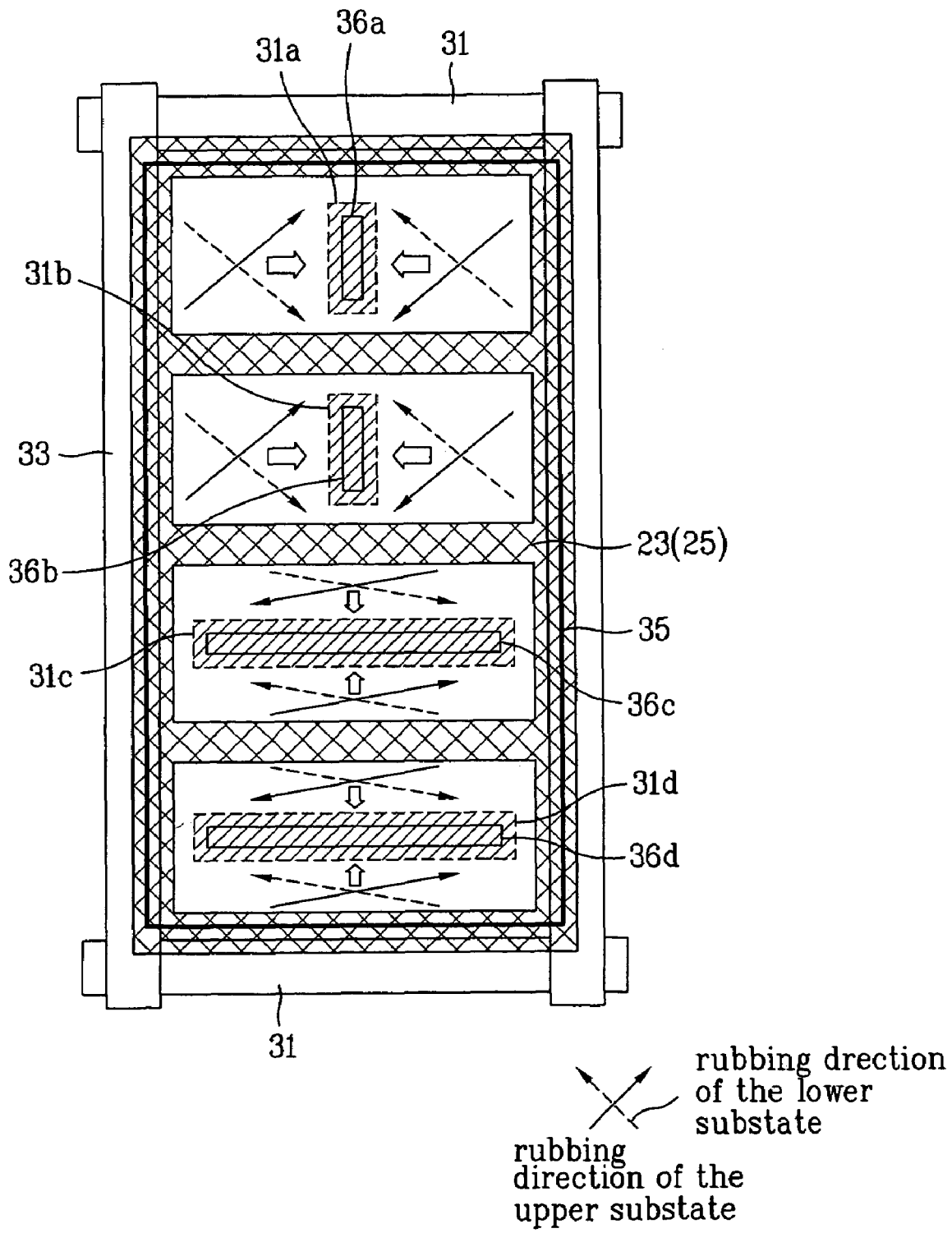

As illustrated in FIG. 11, the first and second regions of the unit pixel region respectively may have the first and second electric field inducing windows 36a and 36b formed substantially perpendicular to the gate line 31 in the unit pixel region, whereby the first and second regions have respective symmetrical structures in left and right directions according to the first and second electric field inducing windows 36a and 36b. Also, the third and fourth regions of the unit pixel region respectively may have the third and fourth electric field inducing windows 36c and 36d formed substantially parallel to the gate line 31 in the unit pixel region, whereby the third and fourth regions have respective symmetrical structures in lower and upper directions according to the third and fourth electric field inducing windows 36c and 36d. As a result, the first to fourth regions are formed in the unit pixel region.

As mentioned above, the unit pixel region of the LCD device according to the second embodiment of the present invention is divided into the eight domains, multi-domains, thereby obtaining a wide viewing angle. Also, it is possible to vary the viewing angle by controlling a size ratio of the respective pixel regions.

The dielectric protrusion 23 is formed on the upper substrate 20 to reinforce a direction of an electric field induced by the lower substrate 30. Also, the first to fourth common auxiliary electrodes 31a, 31b, 31c and 31d disposed below the first to fourth electric field inducing windows 36a, 36b, 36c and 36d reinforce a fringe field, whereby the direction of the electric field inwardly faces in the pixel region.

In case of that the lower and upper substrates 30 and 20 are aligned or rubbed in a splay method as illustrated in FIG. 6 to FIG. 11, the direction of the liquid crystal faces inwardly in the respective regions of the unit pixel region toward the first to fourth electric field inducing windows 36a, 36b, 36c and 36d, as indicated by the arrows of FIG. 6 to FIG. 11. Also, the first to fourth common auxiliary electrodes 31a, 31b, 31c and 31d may be formed during the process forming the gate line 31 or the data line 33, whereby the manufacturing process is simplified.

Also, the pixel electrode 35 may be formed to overlap with the data line 33 at the predetermined portion, thereby improving aperture ratio. In this case, the passivation layer 34 is formed between the pixel electrode 35 and the data line 33 to prevent signal interference between the pixel electrode 35 and the data line 33. The passivation layer 34 may be formed of an organic insulating layer having a low dielectric constant such as Benzocyclobutene (BCB) or photo-acryl. Also, in case of that the predetermined portion of the data line 33 is overlapped with the pixel electrode 35, the black matrix layer 21 is formed on the remaining portion of the data line 33 of the upper substrate 20, whereby the aperture ratio is improved.

It will be apparent to those skilled in the art that various modifications and variations of the gate line 31, the data line 33, the gate insulating layer 32, the black matrix layer 21 and the color filter layer 22 can be made in the present invention. Thus, it is intended that the present invention covers the modifications and variations of this invention provided they come within the scope of the appended claims and their equivalents.

An alignment layer may be formed on an entire surface of at least one of the lower and upper substrates 130 and 120 for an initial alignment of the liquid crystal layer. Herein, an alignment direction is controlled by alignment or rubbing. The alignment layer may be formed of polyamide or polyimide group compound material, polyvinylalcohol (PVA), or polyamic acid with rubbing. Or, the alignment layer may be formed of any material having photoreaction group such as polyvinylcinnamate (PVCN), polysiloxanecinnamate (PSCN) or cellulosecinnamate (CelCN) with light (photo-alignment). In this state, the pretilt angle and alignment direction are simultaneously determined by photo irradiation process step at least one time, and ultraviolet rays of unpolarized light, non-polarized light, linearly polarized light or partially polarized light may be used.

More particularly, the pretilt angle of the alignment layer is about 0°, and the lower and upper substrates are aligned or rubbed in the splay method. Also, in this embodiment, dopant is not added to the liquid crystal layer, whereby the liquid crystal is rotated at the same direction as the electric field. That is, the rotation direction of the liquid crystal is determined according to a voltage applied to the first to fourth common auxiliary electrodes 31a to 31d since the dopant is not added to the liquid crystal layer. The dopant would influence the rotation direction of the liquid crystal.

As mentioned above, the unit pixel region is divided into the eight domains by the distortion of the electric field. Thus, phase difference of the light transmittance is compensated in the unit pixel region, thereby preventing gray inversion. Also, the viewing angle is symmetrical. The aforementioned structure has the aperture ratio of 70% or more as compared to a general TN mode LCD device.

In the LCD device according to the first embodiment of the present invention, as shown in FIG. 6 to FIG. 11, the direction of the liquid crystal molecules inwardly faces the first to fourth electric field inducing windows 36a to 36d in the same direction as the electric field.

The LCD device according to the second embodiment of the present invention has the same structure as that of the LCD device according to the first embodiment of the present invention except that the unit pixel region is divided into the eight domains.

Third Embodiment

Figure 12:
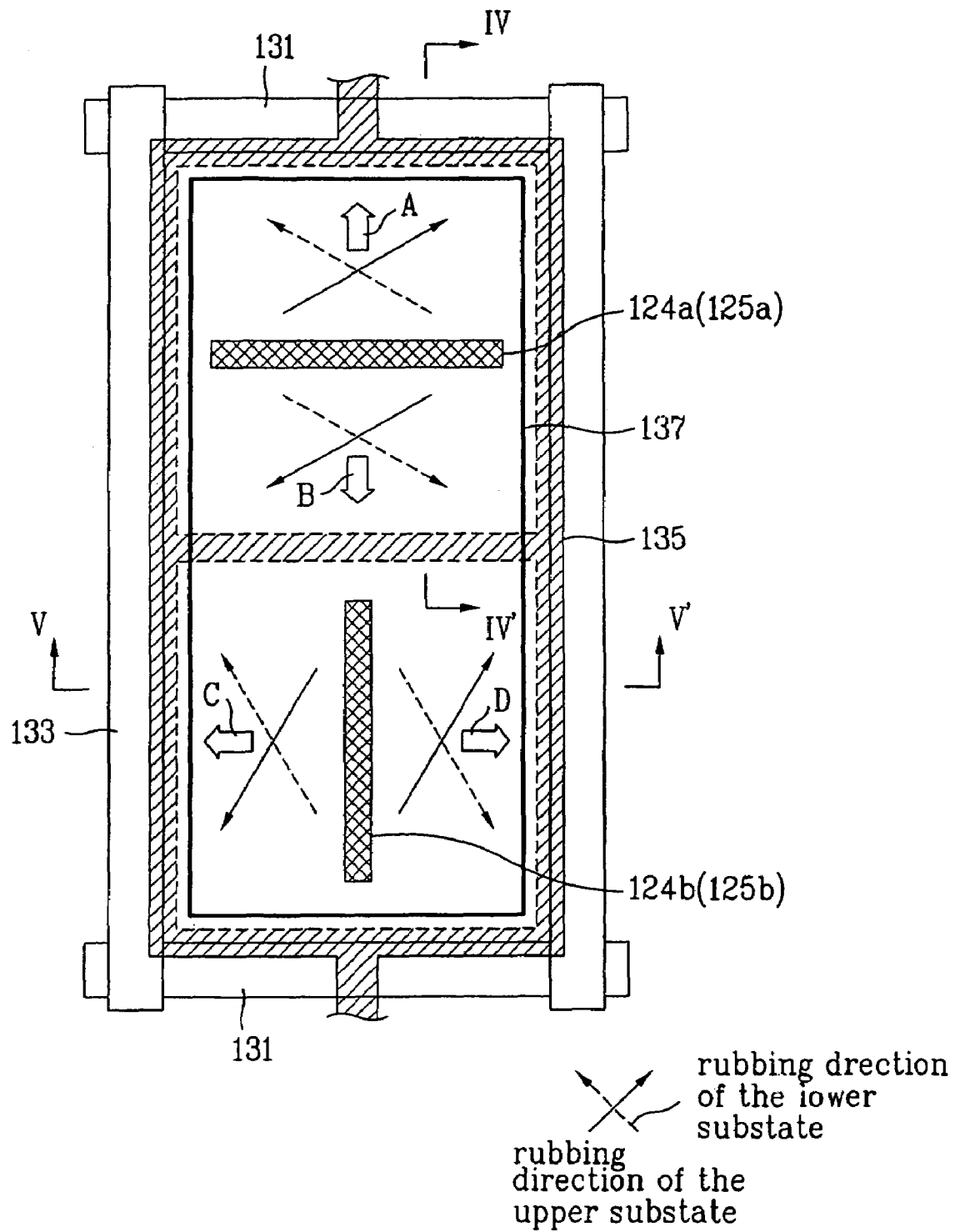
FIG. 12 is an enlarged plan view illustrating a unit pixel of an LCD device according to the third embodiment of the present invention.
Figure 13:
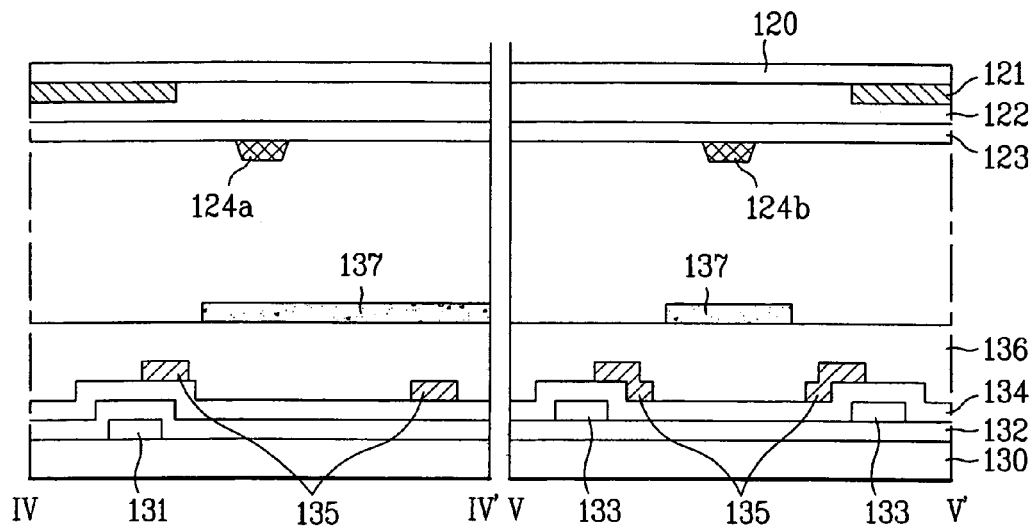
FIG. 13 is a cross-sectional view illustrating a unit pixel of an LCD device taken along lines IV–IV' and V–V' according to one structure of the third embodiment of the present invention.
Figure 14:
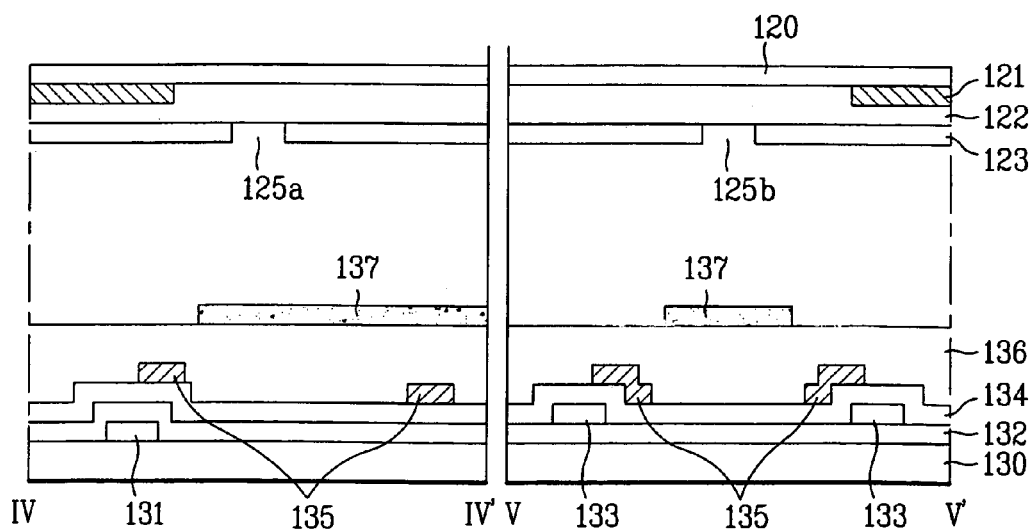
FIG. 14 is a cross-sectional view illustrating a unit pixel of an LCD device taken along lines IV–IV' and V–V' according to another structure of the third embodiment of the present invention.

FIG. 12 is an enlarged plan view illustrating a unit pixel of an LCD device according to the third embodiment of the present invention. FIG. 13 is a cross-sectional view illustrating a unit pixel of an LCD device taken along lines IV–IV' and V–V' according to one structure of the third embodiment of the present invention. FIG. 14 is a cross-sectional view illustrating a unit pixel of an LCD device taken along lines IV–IV' and V–V' according to another structure of the third embodiment of the present invention.

In the LCD device according to the third embodiment of the present invention, as illustrated in FIG. 12 to FIG. 14, a common auxiliary electrode is formed in the periphery of a pixel region, whereby a direction of an electric field outwardly faces the periphery of the pixel region. As a result, liquid crystal molecules outwardly face.

As illustrated in FIG. 12 to FIG. 14, the LCD device according to the third embodiment of the present invention includes lower and upper substrates 130 and 120 facing each other at a fixed interval, a plurality of gate and data lines 131 and 133, a thin film transistor (not shown), a gate insulating layer 132, a first passivation layer 134, a common auxiliary electrode 135, a second passivation layer 136, a pixel electrode 137, a black matrix layer 121, a color filter layer 122, a common electrode 123, first and second dielectric protrusions 124a and 124b, and a liquid crystal layer 140.

On the upper substrate 130, the plurality of gate and data lines 131 and 133 are formed to cross each other for defining a plurality of pixel regions, and the thin film transistor (not shown) is formed at a crossing point of the gate and data lines 131 and 133. Then, the gate insulating layer 132 is formed on an entire surface of the lower substrate 130 including the gate line 131, and the first passivation layer 134 is formed on the entire surface of the lower substrate 130 including the data line 133. The common auxiliary electrode 135 is formed in the periphery and the center portion of the pixel region for being overlapped with the data line 133, and the second passivation layer 136 is formed on the entire surface of the lower substrate 130 including the common auxiliary electrode 135. Also, the pixel electrode is formed on the second passivation layer 136 corresponding to the pixel region for being connected with the thin film transistor.

Next, the black matrix layer 121 is formed on the upper substrate 120 corresponding to regions except the pixel region of the lower substrate 130, and the color filter layer 122 is formed on the upper substrate 120 corresponding to the pixel region of the lower substrate 130 for being partially overlapped with the black matrix layer 121. Then, the common electrode 123 is formed on an entire surface of the upper substrate 120 including the color filter layer 122. The respective first and second dielectric protrusions 124a and 124b are formed on the common electrode 123 corresponding to the pixel electrode 137 and may be substantially parallel and substantially perpendicular to the gate line 31, respectively, or vice versa. The liquid crystal layer 140 is provided between the lower and upper substrates 130 and 120.

As illustrated in FIG. 14, first and second electric field inducing windows 125a and 125b may be formed in the common electrode 123 instead of the first and second dielectric protrusions 124a and 124b on the common electrode 123 of the upper substrate 120. At this time, an overcoat layer (not shown) may be additionally formed on the color filter layer 122 for protecting the color filter layer 122. Referring to FIG. 12 to FIG. 14, the common auxiliary electrode 135 partially overlaps with the gate and data lines 131 and 133.

In FIG. 12 illustrating the plan view of the unit pixel region, the unit pixel region is divided into upper and lower regions by the common auxiliary electrode 135. The upper region is divided into first and second domains according to the first dielectric protrusion 124a or the first electric field inducing window 125a substantially parallel to the gate line 131 in the unit pixel region, and the lower region is divided into third and fourth domains according to the second dielectric protrusion 124b or the second electric field inducing window 125b substantially perpendicular to the gate line 131. As a result, the unit pixel region is divided into the multi-domains according to the first and second dielectric protrusions 124a and 124b or the electric field inducing windows 125a and 125b, whereby a wide viewing angle is obtained since different alignment directions are formed in the unit pixel region.

That is, the upper region of the unit pixel region is divided into the two domains by the first dielectric protrusion 124a or first electric field inducing window 125a formed substantially parallel to the gate line 131 in the pixel region. At this time, the divided two domains are symmetrical in lower and upper directions. In addition, the lower region of the unit pixel region is divided by the second dielectric protrusion 124b or second electric field inducing window 125b formed substantially perpendicular to the gate line 131 in the unit pixel region, whereby the two domains are formed symmetrically in left and right directions. As a result, the four domains are formed in the unit pixel region. Also, the direction of the electric field outwardly faces the periphery of the pixel region because of the common auxiliary electrode 135 formed on the lower substrate 130.

In case of that the lower and upper substrates 130 and 120 are aligned or rubbed in a splay method of FIG. 12, the direction of the liquid crystal outwardly faces the periphery of the pixel region because of the first and second dielectric protrusions 124a and 124b or the first and second electric field inducing windows 125a and 125b. Although not shown, the common auxiliary electrode 135 may be formed during the process forming the gate or data line 131 or 133. In this case, the common auxiliary electrode 135 is formed at a predetermined interval from the gate or data line 131 or 133 for not being overlapped with the gate or data line 131 or 133. Then, the second passivation layer 136 is formed between the pixel electrode 137 and the data line 133 to prevent signal interference between the pixel electrode 137 and the data line 133. The second passivation layer 136 may be formed of an organic insulating layer having a low dielectric constant such as Benzocyclobutene (BCB) or photo-acryl.

It will be apparent to those skilled in the art that various modifications and variations of the gate line 131, the data line 133, the gate insulating layer 132, the black matrix layer 121 and the color filter layer 122 can be made in the present invention. Thus, it is intended that the present invention covers the modifications and variations of this invention provided they come within the scope of the appended claims and their equivalents.

An alignment layer may be formed on an entire surface of at least one of the lower and upper substrates 130 and 120 for an initial alignment of the liquid crystal layer by alignment or rubbing. The alignment layer may be made of polyamide or polyimide group compound material, polyvinylalcohol (PVA), or polyamic acid with rubbing. Or, the alignment layer may be made of any material having photoreaction group such as polyvinylcinnamate (PVCN), polysiloxanecinnamate (PSCN) or cellulosecinnamate (CelCN) with light (photoalignment). In this state, the pretilt angle and alignment direction are simultaneously determined by photo irradiation process step at least one time, and ultraviolet rays of any of unpolarized light, non-polarized light, linearly polarized light or partially polarized light.

More particularly, the pretilt angle of the alignment layer may be about 1° or less, and the lower and upper substrates are rubbed in the splay method. Also, dopant is not added to the liquid crystal layer, whereby liquid crystal molecules are rotated at the same direction as the electric field. That is, the rotation direction of the liquid crystal is determined according to a voltage applied to the common auxiliary electrode 135 since the dopant is not added to the liquid crystal layer. The dopant would influence the rotation direction of the liquid crystal.

Hereinafter, the rotation direction of the liquid crystal will be described in detail.

In the first domain of the pixel region, the direction of the electric field outwardly faces the periphery of the pixel region (arrow A of FIG. 12). In this state, when the voltage is applied to the common auxiliary electrode 135, the liquid crystal molecules that are parallel to the lower and upper substrates 130 and 120 become perpendicular to the lower and upper substrates. At this time, the liquid crystal molecules are rotated clockwise from a direction of ten o'clock, so that the liquid crystal molecules are generally arranged in a direction of twelve o'clock.

In the second domain of the pixel region, the direction of the electric field faces the common auxiliary electrode 135 (arrow B of FIG. 12). In this state, when the voltage is applied to the common auxiliary electrode 135, the liquid crystal molecules that are parallel to the lower and upper substrates become perpendicular to the lower and upper substrates. At this time, the liquid crystal molecules are rotated clockwise from a direction of four o'clock, so that the liquid crystal molecules are generally arranged in a direction of six o'clock.

In the third domain of the pixel region, the direction of the electric field outwardly faces the periphery of the pixel region (arrow C of FIG. 12). In this state, when the voltage is applied to the common auxiliary electrode 135, the liquid crystal molecules that are parallel to the lower and upper substrate become perpendicular to the lower and upper substrates. At this time, the liquid crystal molecules are rotated counterclockwise from a direction of ten o'clock, whereby the liquid crystal molecules are generally arranged in a direction of nine o'clock.

In the fourth domain of the pixel region, the direction of the electric field faces the periphery of the pixel region (arrow D of FIG. 12). In this state, when the voltage is applied to the common auxiliary electrode 135, the liquid crystal molecules that are parallel to the lower and upper substrates become perpendicular to the lower and upper substrates. At this time, the liquid crystal molecules are rotated counterclockwise from a direction of four o'clock, whereby the liquid crystal molecules are generally arranged in a direction of three o'clock.

As mentioned above, the unit pixel region is divided into the four domains by the distortion of the electric field. Thus, phase difference of the light transmittance is compensated in the unit pixel region, thereby preventing gray inversion. Also, the viewing angle is symmetrical. The aforementioned structure has the aperture ratio of 70% or more as compared to a general TN mode LCD device.

In the LCD device according to the third embodiment of the present invention, as shown in FIG. 12, the direction of the liquid crystal molecules outwardly faces the periphery of the respective regions in the pixel region by the first and second dielectric protrusions 124a and 124b or the first and second electric field inducing windows 125a and 125b in the same direction as the electric field.

Fourth Embodiment

FIG. 15 to FIG. 20 are enlarged plan views illustrating a unit pixel of an LCD device according to various structures of the fourth embodiment of the present invention.

In the LCD device according to the fourth embodiment of the present invention, as illustrated in FIG. 15 to FIG. 20, a unit pixel region is divided into eight domains to stably arrange liquid crystal molecules, and a common auxiliary electrode 135 is formed in the periphery of a pixel region, whereby a direction of an electric field outwardly faces. As a result, the whole region of the unit pixel is uniformly influenced by electric field intensity. The LCD device according to the fourth embodiment of the present invention has the same structure as that of the LCD device according to the third embodiment of the present invention excepting the shape of a common auxiliary electrode and the number of electric field inducing windows formed on a dielectric protrusion or a common auxiliary electrode.

As illustrated in FIG. 15 to FIG. 20, and FIG. 13, the LCD device according to the fourth embodiment of the present invention includes lower and upper substrates 130 and 120 facing each other at a fixed interval, a plurality of gate and data lines 131 and 133, a thin film transistor (not shown), a gate insulating layer 132, a first passivation layer 134, a common auxiliary electrode 135, a second passivation layer 136, a pixel electrode 137, a black matrix layer 121, a color filter layer 122, a common electrode 123, first to fourth dielectric protrusions 124a, 124b, 124c and 124d, and a liquid crystal layer 140.

On the upper substrate 130, the plurality of gate and data lines 131 and 133 are formed to cross each other for defining a plurality of pixel regions, and the thin film transistor (not shown) is formed at a crossing point of the gate and data lines 131 and 133. Then, the gate insulating layer 132 is formed on an entire surface of the lower substrate 130 including the gate line 131, and the first passivation layer 134 is formed on the entire surface of the lower substrate 130 including the data line 133. The common auxiliary electrode 135 is formed on the first passivation layer 134 corresponding to the periphery of the pixel region, and having portions crossing the unit pixel for dividing the pixel region into multiple regions, for example, four regions. In the examples illustrated, the portions of the common electrode crossing the unit pixel are substantially parallel to the gate line 131. Also, the second passivation layer 136 is formed on the entire surface of the lower substrate 130 including the common auxiliary electrode 135. The pixel electrode 137 is formed on the second passivation layer 136 corresponding to the pixel region for being connected with the thin film transistor.

Next, the black matrix layer 121 is formed on the upper substrate 120 corresponding to regions except the pixel region of the lower substrate 130, and the color filter layer 122 is formed on the upper substrate 120 corresponding to the pixel region of the lower substrate 130 for being partially overlapped with the black matrix layer 121. Then, the common electrode 123 is formed on an entire surface of the upper substrate 120 including the color filter layer 122. Also, the first to fourth dielectric protrusions 124a, 124b, 124c and 124d are formed on the common electrode 123 corresponding to the pixel electrode 137 for dividing the pixel region into domains, of which two are formed substantially parallel to the gate line 131 in the pixel region, and the other two are formed substantially perpendicular to the gate line 131 formed in the pixel region. After that, the liquid crystal layer 140 is provided between the lower and upper substrates 130 and 120.

In the aforementioned structure of the LCD device, as illustrated in FIG. 14, first to fourth electric field inducing windows 125a, 125b, 125c and 125d may be formed in the common electrode 123 instead of the first to fourth dielectric protrusions 124a, 124b, 124c and 124d on the common electrode 123 of the upper substrate 120. The common auxiliary electrode 135, as illustrated in FIG. 15 to FIG. 20, is partially overlapped with the gate or data line 131 or 133.

As illustrated in the drawings showing the plan view of the pixel region, the unit pixel region is divided into four regions by portions the common auxiliary electrode 135. Then, the first to fourth dielectric protrusions 124a, 124b, 124c and 124d or the first to fourth electric field inducing windows 125a, 125b, 125c and 125d are respectively formed in the four regions divided by the common auxiliary electrode 135, thereby dividing the unit pixel region into eight domains. At this time, the two of the first to fourth dielectric protrusions 124a, 124b, 124c and 124d or the first to fourth electric field inducing windows 125a, 125b, 125c and 125d are formed substantially perpendicular to the gate line 131 in the two regions of the pixel region, and the other two are formed substantially parallel to the gate line 131 in the other two regions of the pixel region.

Figure 15:
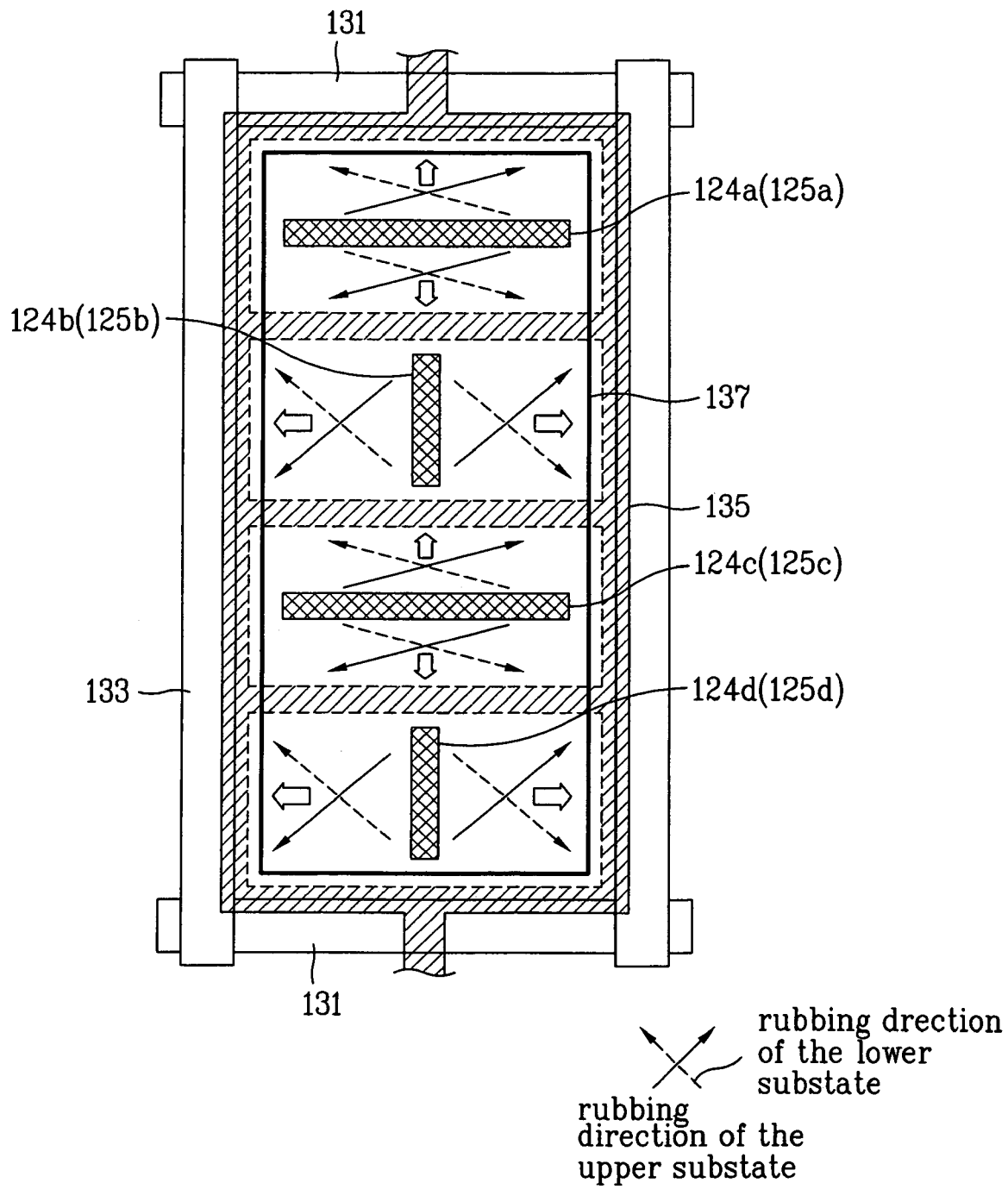
FIG. 15 to FIG. 20 are enlarged plan views illustrating a unit pixel of an LCD device according to various structures of the fourth embodiment of the present invention.
Figure 16:
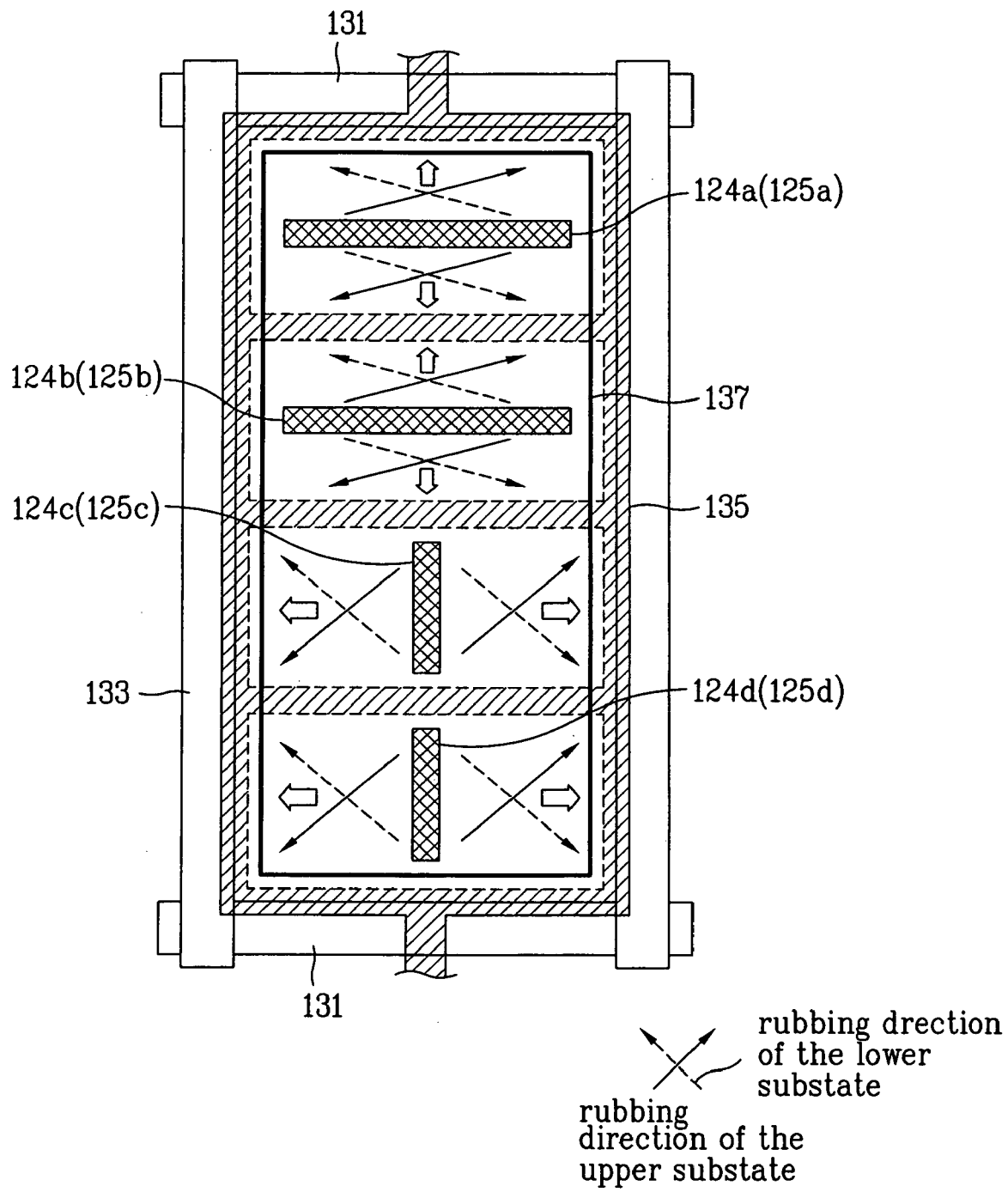
Figure 18:
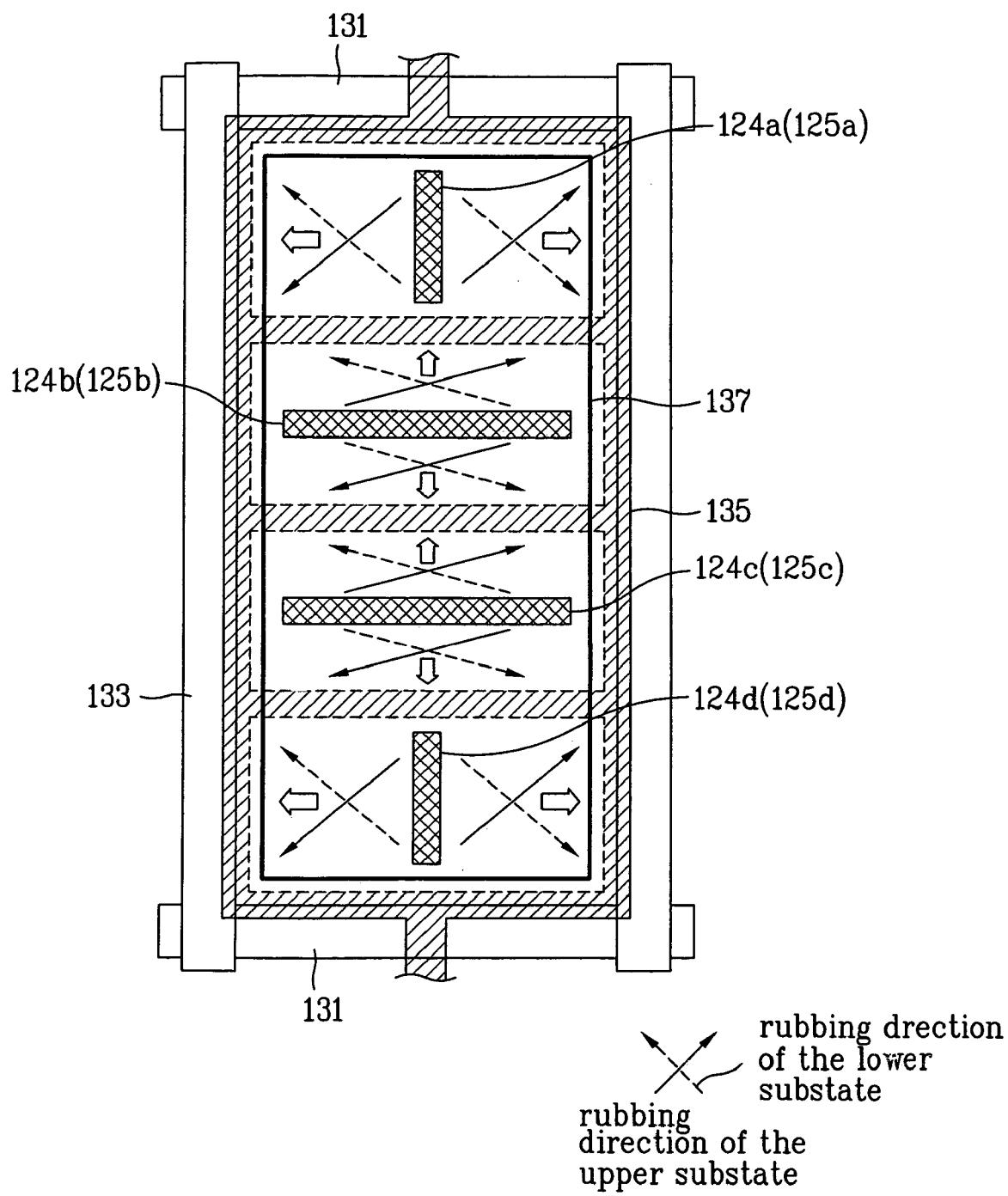
Figure 19:
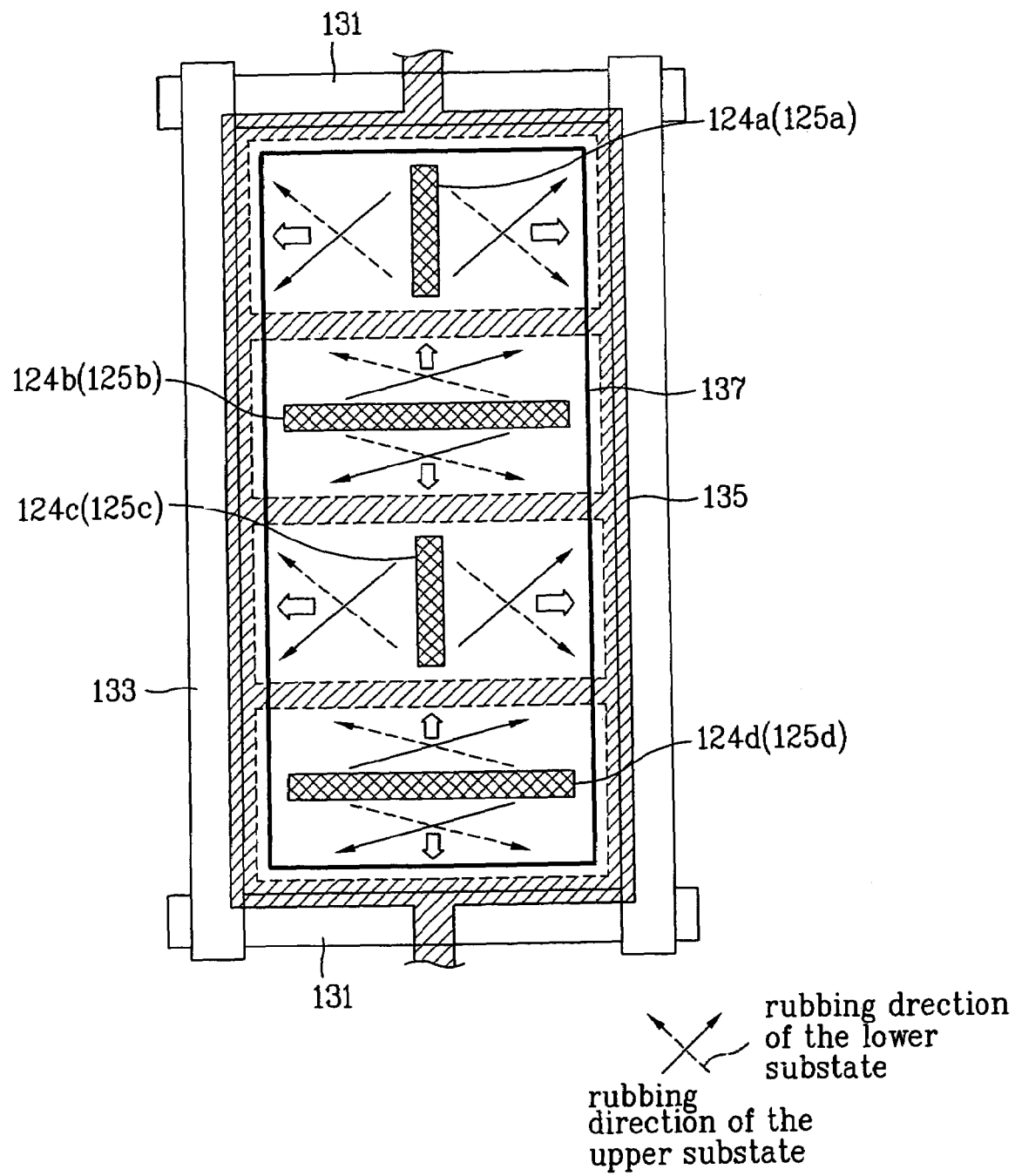
Figure 20:
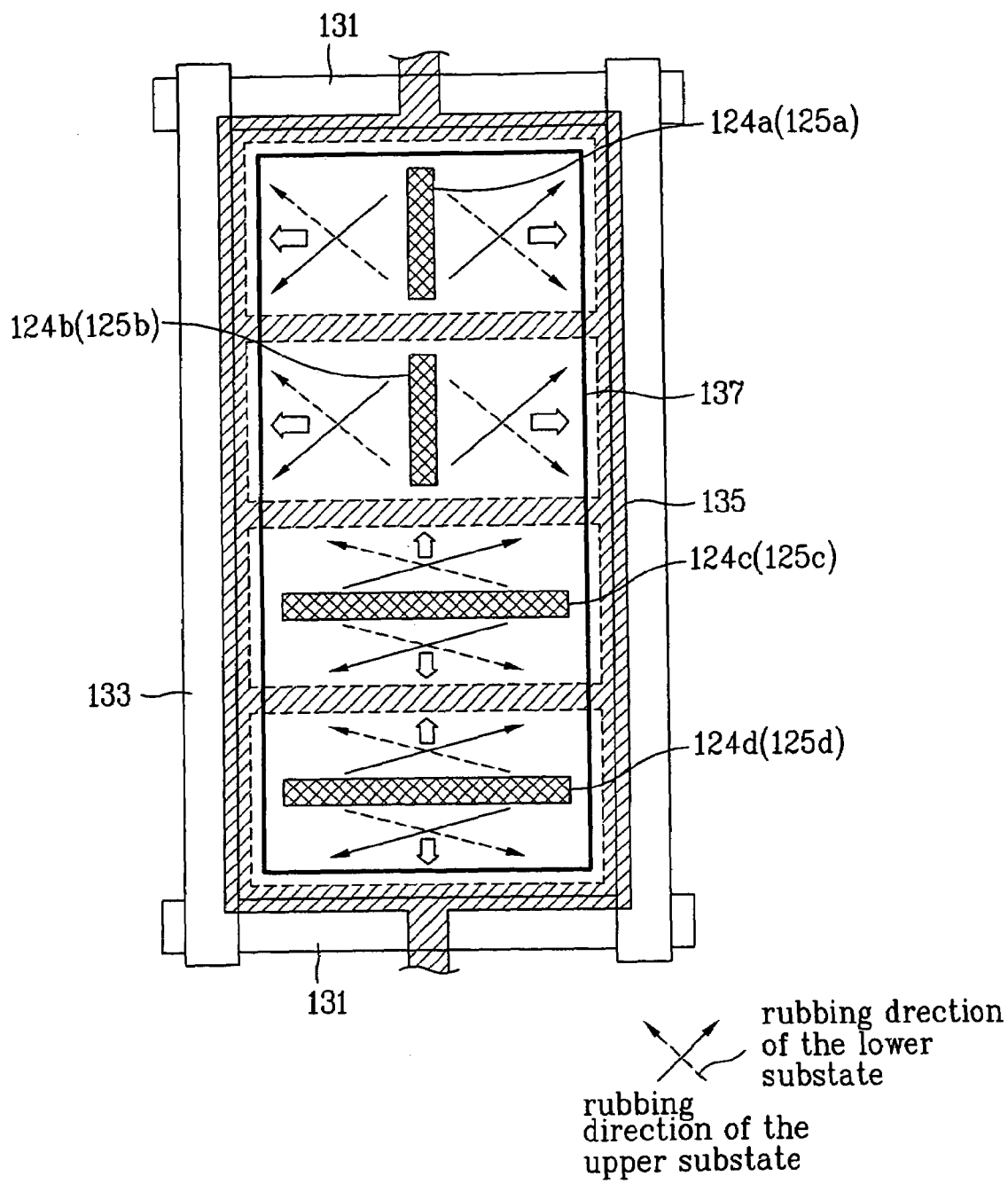

For example, as illustrated in FIG. 15, the first and third dielectric protrusions or electric field inducing windows 124a and 124c or 125a and 125c are formed substantially parallel to the gate line 131 in the first and third regions of the unit pixel region, and the second and fourth dielectric protrusions or electric field inducing windows 124b and 124d or 125b and 125d are formed substantially perpendicular to the gate line 131 in the second and fourth regions of the unit pixel region. In FIG. 16, the first and second dielectric protrusions or electric field inducing windows 124a and 124b or 125a and 125b are formed substantially parallel to the gate line 131 in the first and second regions of the unit pixel region, and the third and fourth dielectric protrusions or electric field inducing windows 124c and 124d or 125c and 125d are formed substantially perpendicular to the gate line 131 in the third and fourth regions of the unit pixel region. In case of FIG. 17, the first and fourth dielectric protrusions or electric field inducing windows 124a and 124d or 125a and 125d are formed substantially parallel to the gate line 131 in the first and fourth regions of the unit pixel region, and the second and third dielectric protrusions or electric field inducing windows 124b and 124c or 125b and 125c are formed substantially perpendicular to the gate line 131 in the second and third regions of the unit pixel region. In FIG. 18, the first and fourth dielectric protrusions or electric field inducing windows 124a and 124d or 125a and 125d are formed substantially perpendicular to the gate line 131 in the first and fourth regions of the unit pixel region, and the second and third dielectric protrusions or electric field inducing windows 124b and 124c or 125b and 125c are formed substantially parallel to the gate line 131 in the second and third regions of the unit pixel region. As illustrated in FIG. 19, the first and third dielectric protrusions or electric field inducing windows 124a and 124c or 125a and 125c are formed substantially perpendicular to the gate line 131 in the first and third regions of the unit pixel region, and the second and fourth dielectric protrusions or electric field inducing windows 124b and 124d or 125b and 125d are formed substantially parallel to the gate line 131 in the second and fourth regions of the unit pixel region. In FIG. 20, the first and second dielectric protrusions or electric field inducing windows 124a and 124b or 125a and 125b are formed substantially perpendicular to the gate line 131 in the first and second regions of the unit pixel region, and the third and fourth dielectric protrusions or electric field inducing windows 124c and 124d or 125c and 125d are formed substantially parallel to the gate line 131 in the third and fourth regions of the unit pixel region.

In other words, as illustrated in FIG. 15, the first and third regions of the unit pixel region respectively may have the first and third dielectric protrusions or electric field inducing windows 124a and 124c or 125a and 125c formed substantially parallel to the gate line 131 in the unit pixel region, whereby the first and third regions have respective symmetrical structures in lower and upper directions. Also, the second and fourth regions of the unit pixel region respectively may have the second and fourth dielectric protrusions or electric field inducing windows 124b and 124d or 125b and 125d formed substantially perpendicular to the gate line 131 in the unit pixel region, whereby the second and fourth regions have respective symmetrical structures in left and right directions. As a result, the first to fourth regions are formed in the unit pixel region.

In FIG. 16, the first and second regions of the unit pixel region respectively may have the first and second dielectric protrusions or electric field inducing windows 124a and 124b or 125a and 125b formed substantially parallel to the gate line 131 in the unit pixel region, whereby the first and second regions have respective symmetrical structures in lower and upper directions. Also, the third and fourth regions of the unit pixel region respectively may have the third and fourth dielectric protrusions or electric field inducing windows 124c and 124d or 125c and 125d formed substantially perpendicular to the gate line 131 in the unit pixel region, whereby the third and fourth regions have respective symmetrical structures in left and right directions. As a result, the first to fourth regions are formed in the unit pixel region.

Figure 17:
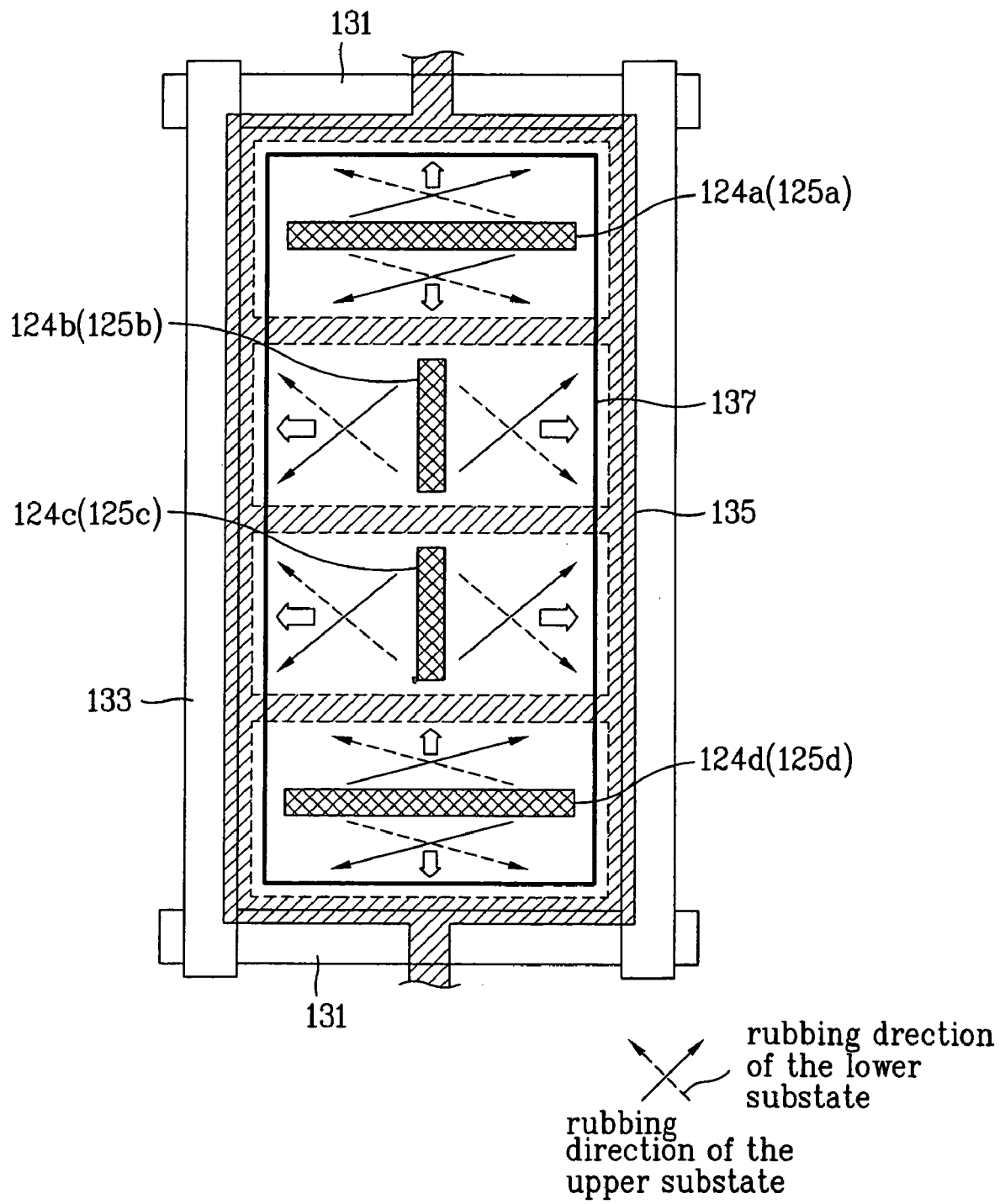

As illustrated in FIG. 17, the first and fourth regions of the unit pixel region respectively may have the first and fourth dielectric protrusions or electric field inducing windows 124a and 124d or 125a and 125d formed substantially parallel to the gate line 131 in the unit pixel region, whereby the first and fourth regions have respective symmetrical structures in lower and upper directions. Also, the second and third regions of the unit pixel region respectively may have the second and third dielectric protrusions or electric field inducing windows 124b and 124c or 125b and 125c formed substantially perpendicular to the gate line 131 in the unit pixel region, whereby the second and third regions have respective symmetrical structures in left and right directions. As a result, the first to fourth regions are formed in the unit pixel region.

As illustrated in FIG. 18, the first and fourth regions of the unit pixel region respectively may have the first and fourth dielectric protrusions or electric field inducing windows 124*a* and 124*d* or 125*a* and 125*d* formed substantially perpendicular to the gate line 131 in the unit pixel region, whereby the first and fourth regions have respective symmetrical structures in left and right directions. Also, the second and third regions of the unit pixel region respectively may have the second and third dielectric protrusions or electric field inducing windows 124*b* and 124*c* or 125*b* and 125*c* formed substantially parallel to the gate line 131 in the unit pixel region, whereby the second and third regions have respective symmetrical structures in lower and upper directions. As a result, the first to fourth regions are formed in the unit pixel region.

As illustrated in FIG. 19, the first and third regions of the unit pixel region respectively may have the first and third dielectric protrusions or electric field inducing windows 124*a* and 124*c* or 125*a* and 125*c* formed substantially perpendicular to the gate line 131 in the unit pixel region, whereby the first and third regions have respective symmetrical structures in left and right directions. Also, the second and fourth regions of the unit pixel region respectively may have the second and fourth dielectric protrusions or electric field inducing windows 124*b* and 124*d* or 125*b* and 125*d* formed substantially parallel to the gate line 131 in the unit pixel region, whereby the second and fourth regions have respective symmetrical structures in lower and upper directions. As a result, the first to fourth regions are formed in the unit pixel region.

As illustrated in FIG. 20, the first and second regions of the unit pixel region respectively may have the first and second dielectric protrusions or electric field inducing windows 124*a* and 124*b* or 125*a* and 125*b* formed substantially perpendicular to the gate line 131 in the unit pixel region, whereby the first and second regions have respective symmetrical structures in left and right directions. Also, the third and fourth regions of the unit pixel region respectively may have the third and fourth dielectric protrusions or electric field inducing windows 124*c* and 124*d* or 125*c* and 125*d* formed substantially perpendicular to the gate line 131 in the unit pixel region, whereby the third and fourth regions have respective symmetrical structures in lower and upper directions. As a result, the first to fourth regions are formed in the unit pixel region.

As mentioned above, the unit pixel region may be divided into eight domains, multi-domains, by the first to fourth dielectric protrusions or electric field inducing windows 124*a*, 124*b*, 124*c* and 124*d* or 125*a*, 125*b*, 125*c* and 125*d*, thereby obtaining a wide viewing angle. Also, it is possible to vary the viewing angle by controlling a size ratio of the respective regions.

The direction of the electric field faces the periphery of the respective regions in the pixel region by the common auxiliary electrode 135. In case of that the alignment or rubbing direction of the lower and upper substrates 130 and 120 are formed in a splay method shown in FIG. 15 to FIG. 20, the direction of the liquid crystal outwardly faces the periphery of the respective regions in the pixel region by the first to fourth dielectric protrusions or electric field inducing windows 124*a*, 124*b*, 124*c* and 124*d* or 125*a*, 125*b*, 125*c* and 125*d* as illustrated in arrow directions of drawings.

The second passivation layer 136 is formed between the pixel electrode 137 and the data line 133 to prevent signal interference between the pixel electrode 137 and the data line 133. The second passivation layer 136 may be formed of an organic insulating layer having a low dielectric constant such as Benzocyclobutene (BCB) or photo-acryl. It will be apparent to those skilled in the art that various modifications and variations of the gate line 131, the data line 133, the gate insulating layer 132, the black matrix layer 121 and the color filter layer 122 can be made in the present invention. Thus, it is intended that the present invention covers the modifications and variations of this invention provided they come within the scope of the appended claims and their equivalents.

An alignment layer may be formed on an entire surface of at least one of the lower and upper substrates 130 and 120 for an initial alignment of the liquid crystal layer by rubbing or other alignment method. The alignment layer may be made of polyamide or polyimide group compound material, polyvinylalcohol (PVA), or polyamic acid with rubbing. Or, the alignment layer may be made of any material having photoreaction group such as polyvinylcinnamate (PVCN), polysiloxanecinnamate (PSCN) or cellulosecinnamate (CelCN) with light (photoalignment). In this state, the pretilt angle and alignment direction are simultaneously determined by photo irradiation process step at least one time. Ultraviolet rays of any of unpolarized light, non-polarized light, linearly polarized light or partially polarized light may be used.

More particularly, the pretilt angle of the alignment layer may be about 1° or less, and the lower and upper substrates are rubbed or aligned in the splay method. Also, dopant is not added to the liquid crystal layer, whereby liquid crystal molecules are rotated at the same direction as the electric field. That is, the rotation direction of the liquid crystal is determined according to a voltage applied to the common auxiliary electrode 135 because the dopant is not added to the liquid crystal layer. The dopant would influence the rotation direction of the liquid crystal.

As mentioned above, the unit pixel region is divided into the eight domains by the distortion of the electric field. Thus, phase difference of the light transmittance is compensated in the unit pixel region, thereby preventing gray inversion. Also, the viewing angle is symmetrical. The aforementioned structure has the aperture ratio of 70% or more as compared to a general TN mode LCD device.

In the LCD device according to the fourth embodiment of the present invention, as shown in FIG. 15 to FIG. 20, the direction of the liquid crystal molecules outwardly faces the periphery of the respective regions in the pixel region by the first to fourth dielectric protrusions or electric field inducing windows 124*a*, 124*b*, 124*c* and 124*d* or 125*a*, 125*b*, 125*c* and 125*d* in the same direction as the electric field.

The LCD device according to the fourth embodiment of the present invention has the same structure as that of the LCD device according to the third embodiment of the present invention except that the unit pixel region is divided into the eight domains.

Fifth Embodiment

Figure 21:
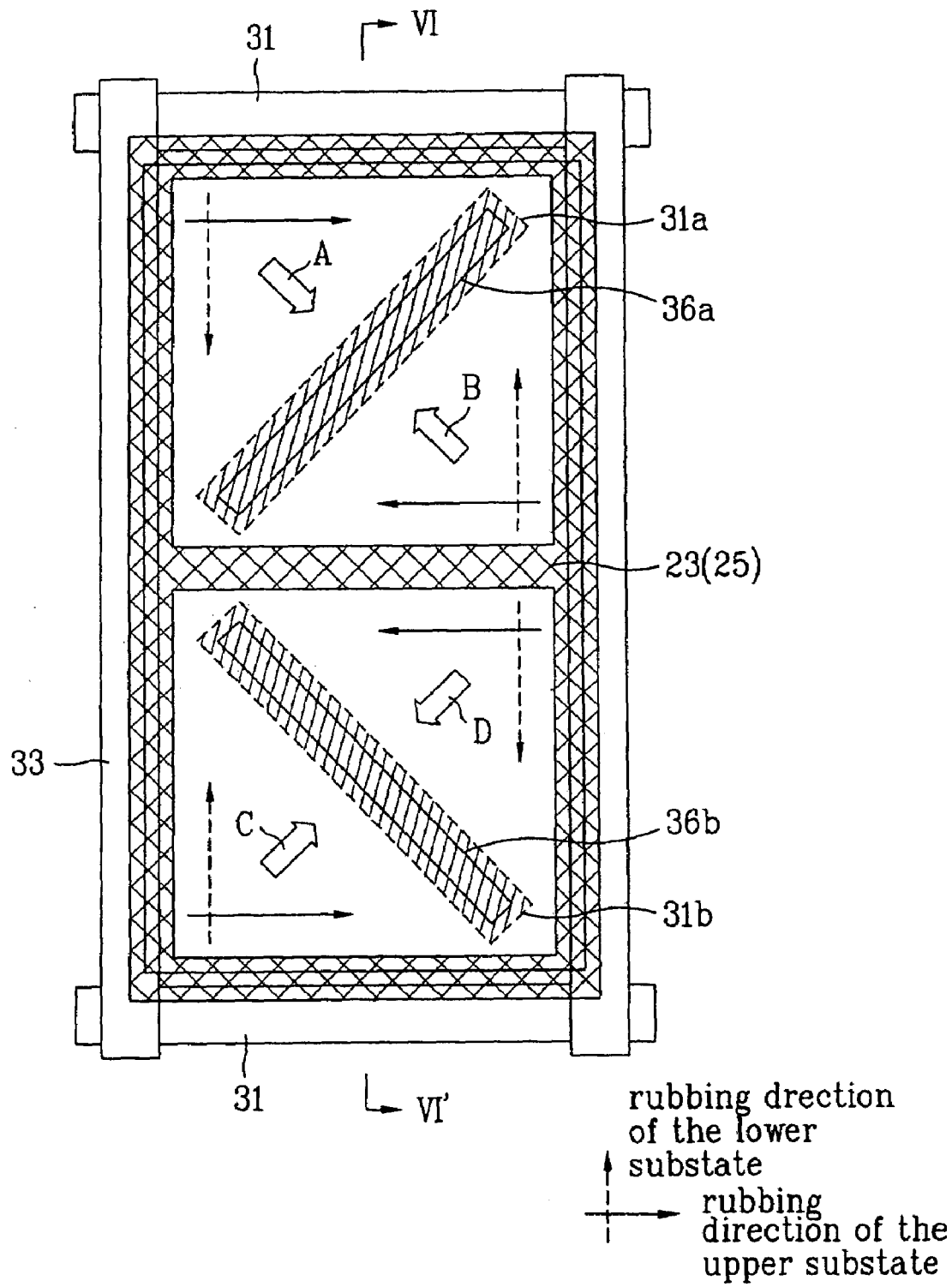
FIG. 21 is an enlarged plan view illustrating a unit pixel of an LCD device according to the fifth embodiment of the present invention.
Figure 22:
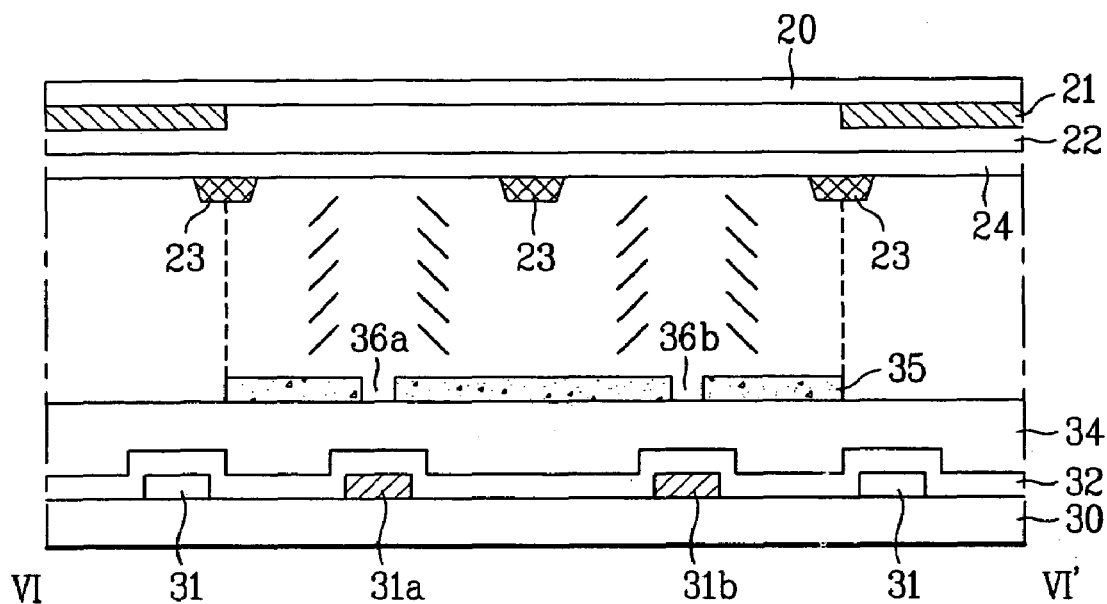
FIG. 22 is a cross-sectional view illustrating a unit pixel of an LCD device taken along line VI–VI' of FIG. 21 according to one structure of the fifth embodiment of the present invention.
Figure 23:
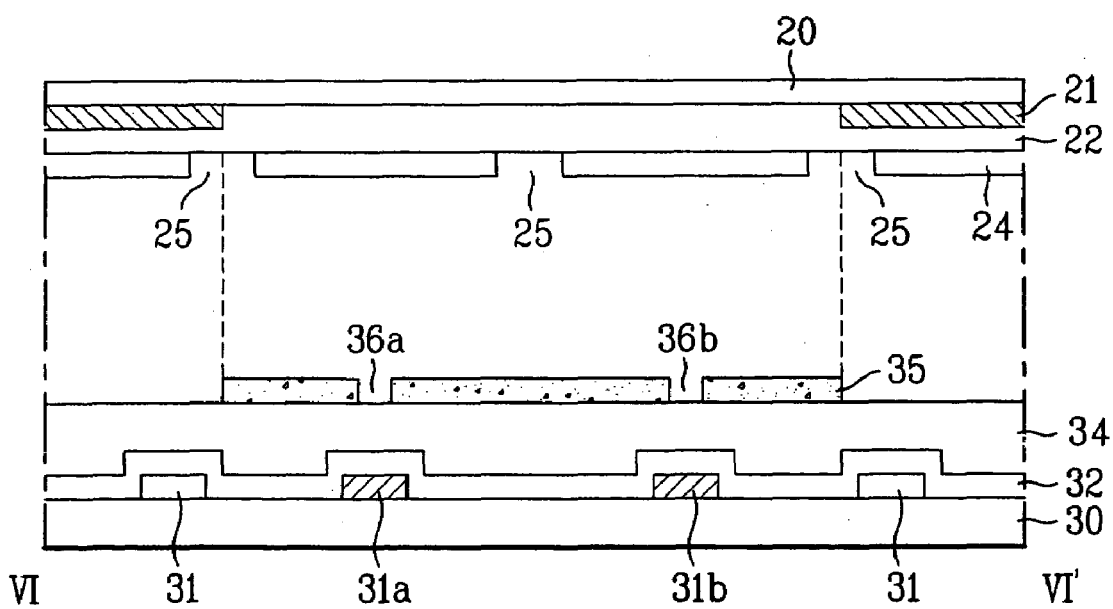
FIG. 23 is a cross-sectional view illustrating a unit pixel of an LCD device taken along line VI–VI' of FIG. 21 according to another structure of the fifth embodiment of the present invention.

FIG. 21 is an enlarged plan view illustrating a unit pixel of an LCD device according to the fifth embodiment of the present invention. FIG. 22 is a cross-sectional view illustrating a unit pixel of an LCD device taken along line VI–VI' of FIG. 21 according to one structure of the fifth embodiment of the present invention. FIG. 23 is a cross-sectional view illustrating a unit pixel of an LCD device taken along line VI–VI' of FIG. 21 according to another structure of the fifth embodiment of the present invention.

In the LCD device according to the fifth embodiment of the present invention, first and second electric field inducing windows are respectively formed in diagonal directions of respective regions of a unit pixel region. Also, a lower substrate is oriented at 90°, and an upper substrate is oriented at 0°, thereby improving a viewing angle in all directions.

As illustrated in FIG. 21 and FIG. 22, the LCD device according to the fifth embodiment of the present invention includes lower and upper substrates 30 and 20 facing each other, a plurality of gate and data lines 31 and 33, a thin film transistor (not shown), first and second common auxiliary electrodes 31a and 31b, a gate insulating layer 32, a passivation layer 34, a pixel electrode 35, a black matrix layer 21, a color filter layer 22, a common electrode 24, a dielectric protrusion 23 and a liquid crystal layer 40.

On the lower substrate 30, the plurality of gate and data lines 31 and 33 are formed to cross each other for defining a plurality of pixel regions, and the thin film transistor (not shown) is formed at a crossing point of the gate and data lines 31 and 33. Then, the first and second common auxiliary electrodes 31a and 31b are formed at the same layer as the gate or data line 31 and 33, which are respectively formed in the diagonal directions for dividing two regions of the pixel region into four domains. The gate insulating layer 32 is formed on an entire surface of the lower substrate 30 including the gate line 31 and the first and second common auxiliary electrodes 31a and 31b, and the passivation layer 34 is formed on the entire surface of the lower substrate 30 including the data line 33. Also, the pixel electrode 35 is formed on the passivation layer 34 corresponding to the pixel region for being connected to the thin film transistor, the pixel electrode 35 having first and second electric field inducing windows 36a and 36b respectively corresponding to the first and second common auxiliary electrodes 31a and 31b.

Next, the black matrix layer 21 is formed on the upper substrate 20 corresponding to regions except the pixel region of the lower substrate 30, and the color filter layer 22 is formed on the upper substrate 20 corresponding to the pixel region of the lower substrate 30 for being partially overlapped with the black matrix layer 21. Then, the common electrode 24 is formed on an entire surface of the upper substrate including the color filter layer 22, and the dielectric protrusion 23 is formed on the common electrode 24 corresponding to the periphery of the pixel electrode and a boundary dividing the unit pixel region into the two regions. After that, the liquid crystal layer 40 is formed between the lower and upper substrates 30 and 20.

In the aforementioned structure of the LCD device, as illustrated in FIG. 23, an electric field inducing window 25 may be formed in the common electrode 24 instead of the dielectric protrusion 23 on the common electrode 24 of the upper substrate 20. Although not shown, an overcoat layer may be additionally formed on the color filter layer 22. In case of that the electric field inducing window 25 is formed on the upper substrate 20 instead of the dielectric protrusion 23, it is not necessary to form the overcoat layer since the overcoat layer is used for effectively forming the electric field inducing window 25.

In the LCD device according to the fifth embodiment of the present invention, the first and second electric field inducing windows 36a and 36b may be formed in the diagonal directions for being parallel to each other, or not. Also, as illustrated in FIG. 21, the dielectric protrusion 23 or the electric field inducing window 25 is partially overlapped with the periphery of the pixel electrode 35.

As illustrated in FIG. 21 showing the plan view of the unit pixel electrode, the pixel region is divided into two regions, lower and upper regions, by the dielectric protrusion 23. Then, the upper region of the pixel region is divided into first and second domains by the first electric field inducing window 36a diagonally formed in the upper region, and the lower region of the pixel region is divided into third and fourth domains by the second electric field inducing window 36b diagonally formed in the lower region. Thus, the unit pixel region is divided into the four domains, multi-domains, by the first and second electric field inducing windows 36a and 36b, thereby obtaining a wide viewing angle. That is, the unit pixel region is divided into the lower and upper regions according to the dielectric protrusion 23. Then, the upper region is divided into the two domains by the first electric field inducing window 36a diagonally formed in the upper region of the unit pixel region. At this time, the divided two domains are symmetrical to the first electric field inducing window 36a. Next, the lower region is divided by the second electric field inducing window 36b diagonally formed in the lower region of the unit pixel region, whereby the two domains are formed symmetrically to the second electric field inducing window 36b. As a result, the four domains are formed in the unit pixel region.

The dielectric protrusion 23 is formed on the upper substrate 20 to reinforce a direction of an electric field induced by the lower substrate 30. Also, the first and second common auxiliary electrodes 31a and 31b disposed below the first and second electric field inducing windows 36a and 36b reinforce a fringe field, whereby the direction of the electric field inwardly faces by the first and second electric field inducing windows 36a and 36b.

As mentioned above, the lower substrate is aligned or rubbed at 90°, and the upper substrate is aligned or rubbed at 0°, whereby liquid crystal molecules, as illustrated by the arrows of FIG. 21, inwardly face the first and second electric field inducing windows 36a and 36b in the respective regions of the unit pixel region. Also, the first and second common auxiliary electrodes 31a and 31b may be formed during the process forming the gate line 31 or the data line 33, whereby the manufacturing process is simplified.

FIG. 22 and FIG. 23 illustrate that the first and second common auxiliary electrodes 31a and 31b are formed with the gate line 31 at the same time. The pixel electrode 35 is formed for being overlapped with the data line 33 at a predetermined portion, thereby improving aperture ratio. In this case, the passivation layer 34 is formed between the pixel electrode 35 and the data line 33 to prevent signal interference between the pixel electrode 35 and the data line 33. The passivation layer 34 may be formed of an organic insulating layer having a low dielectric constant such as Benzocyclobutene (BCB) or photo-acryl. Also, in case of that the predetermined portion of the data line 33 is overlapped with the pixel electrode 35, the black matrix layer 21 is formed on the remaining portion of the data line 33, whereby the aperture ratio is improved.

It will be apparent to those skilled in the art that various modifications and variations of the gate line 31, the data line 33, the gate insulating layer 32, the black matrix layer 21 and the color filter layer 22 can be made in the present invention. Thus, it is intended that the present invention covers the modifications and variations of this invention provided they come within the scope of the appended claims and their equivalents.

An alignment layer is formed on an entire surface of at least one of the lower and upper substrates 30 and 20 for an initial alignment of the liquid crystal layer. At this time, the alignment layer may be formed of polyamide or polyimide group compound material, polyvinylalcohol (PVA), or polyamic acid with rubbing. Or, the alignment layer may be formed of any material having photoreaction group such as polyvinylcinnamate (PVCN), polysiloxanecinnamate (PSCN) or cellulosecinnamate (CelCN) with light (photoalignment). In this state, the pretilt angle and alignment direction are simultaneously determined by photo irradiation process step at least one time. Ultraviolet rays of any of unpolarized light, non-polarized light, linearly polarized light or partially polarized light may be used.

More particularly, the pretilt angle of the alignment layer may be about 0°, and the lower and upper substrates are aligned or rubbed in the splay method. Also, dopant is not added to the liquid crystal layer, whereby the liquid crystal is rotated at the same direction as the electric field. That is, the rotation direction of the liquid crystal is determined according to a voltage applied to the first and second common auxiliary electrodes 31a and 31b because the dopant is not added to the liquid crystal layer. The dopant would influence the rotation direction of the liquid crystal.

Hereinafter, the rotation direction of the liquid crystal will be described in detail.

In the first domain of the pixel region, the direction of the electric field inwardly faces the first common auxiliary electrode 31a (arrow A of FIG. 21). In this state, when a voltage is applied to the first common auxiliary electrode 31a, the liquid crystal molecules that are parallel to the lower and upper substrates become perpendicular to the lower and upper substrates. At this time, the liquid crystal molecules are rotated counterclockwise from a direction of six o'clock, so that the liquid crystal molecules are generally arranged in a direction of four-thirty.

In the second domain of the pixel region, the direction of the electric field inwardly faces the first common auxiliary electrode 31a (arrow B of FIG. 21). In this state, when the voltage is applied to the first common auxiliary electrode 31a, the liquid crystal molecules that are parallel to the lower and upper substrates become perpendicular to the lower and upper substrates. At this time, the liquid crystal molecules are rotated counterclockwise from a direction of twelve o'clock, so that the liquid crystal molecules are generally arranged in a direction of ten-thirty.

In the third domain of the pixel region, the direction of the electric field inwardly faces the second common auxiliary electrode 31b (arrow C of FIG. 21). In this state, when the voltage is applied to the second common auxiliary electrode 31b, the liquid crystal molecules that are substantially parallel to the lower and upper substrate become substantially perpendicular to the lower and upper substrates. At this time, the liquid crystal molecules are rotated clockwise from a direction of twelve o'clock, whereby the liquid crystal molecules are generally arranged in a direction of one-thirty.

In the fourth domain of the pixel region, the direction of the electric field inwardly faces the second common auxiliary electrode 31b (arrow D of FIG. 21). In this state, when the voltage is applied to the second common auxiliary electrode 31b, the liquid crystal molecules that are substantially parallel to the lower and upper substrates become substantially perpendicular to the lower and upper substrates. At this time, the liquid crystal molecules are rotated clockwise from a direction of six o'clock, whereby the liquid crystal molecules are generally arranged in a direction of seven-thirty.

As mentioned above, the unit pixel region is divided into the four domains by the distortion of the electric field. Thus, phase difference of the light transmittance is compensated in the unit pixel region, thereby preventing gray inversion. Also, the viewing angle is symmetrical. The aforementioned structure has the aperture ratio of 70% or more as compared to a general TN mode LCD device.

In the LCD device according to the fifth embodiment of the present invention, as illustrated in FIG. 21, the direction of the liquid crystal molecules inwardly faces the first and second electric field inducing windows 36a and 36b in the same direction as the electric field.

Sixth Embodiment

Figure 24:
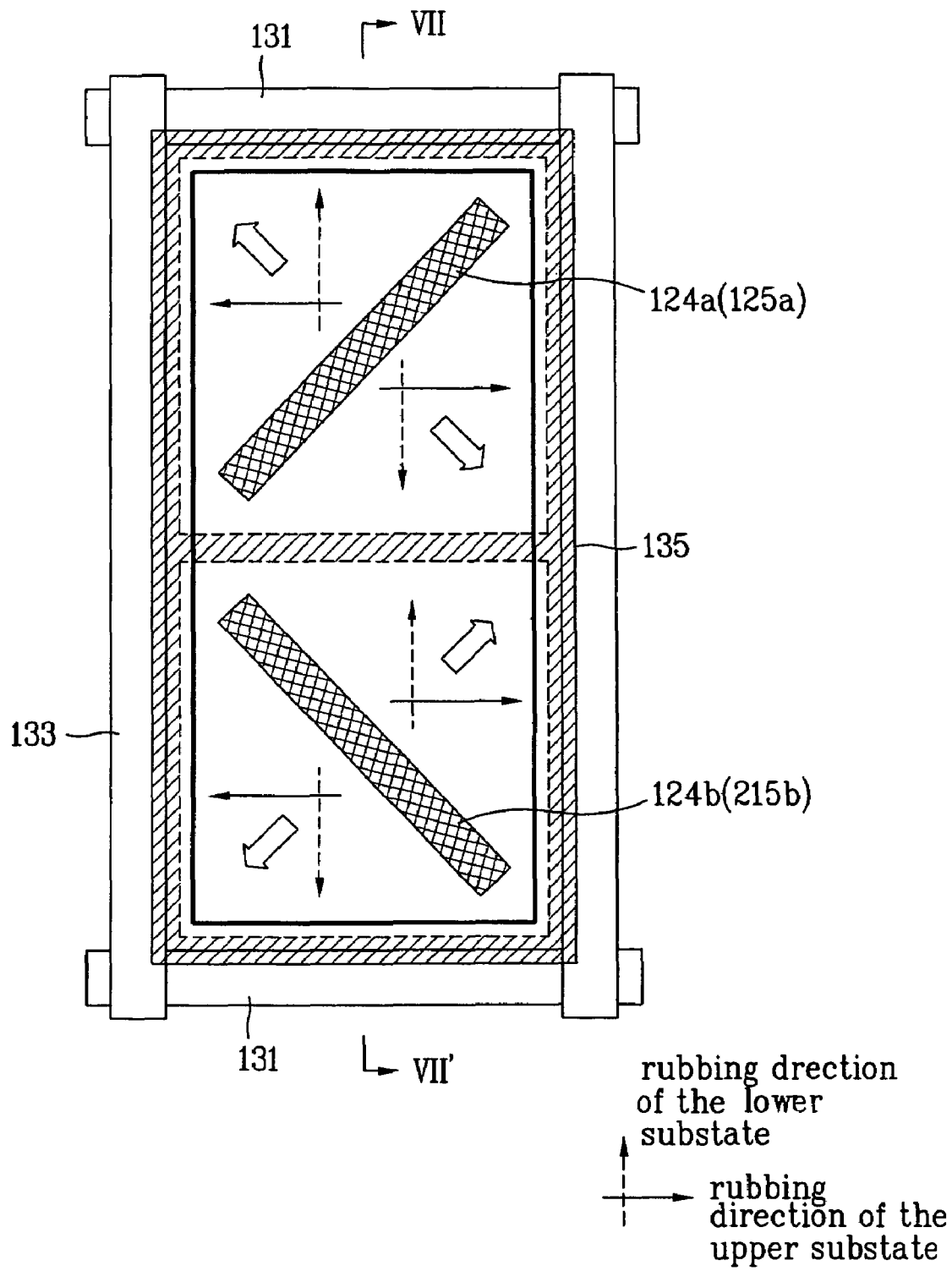
FIG. 24 is an enlarged plan view illustrating a unit pixel of an LCD device according to the sixth embodiment of the present invention.
Figure 25:
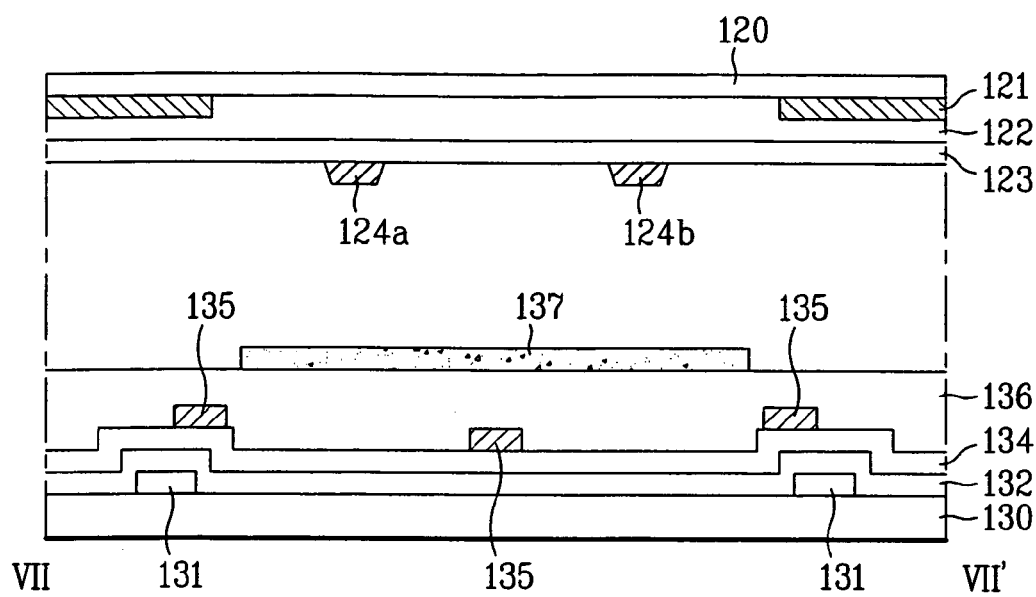
FIG. 25 is a cross-sectional view illustrating a unit pixel of an LCD device taken along line VII–VII' of FIG. 24 according to one structure of the sixth embodiment of the present invention.
Figure 26:
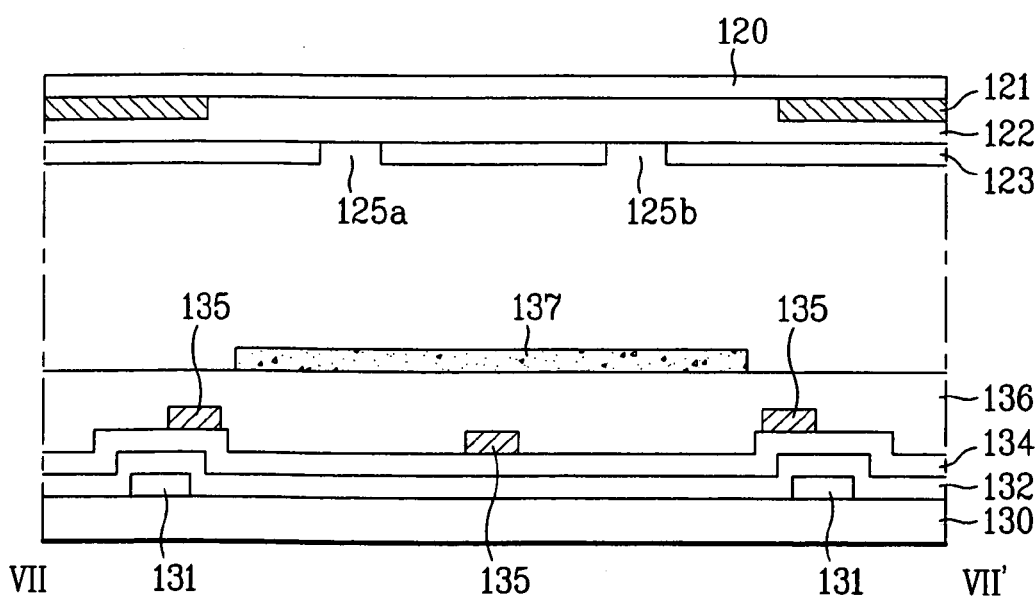
FIG. 26 is a cross-sectional view illustrating a unit pixel of an LCD device taken along line VII–VII' of FIG. 24 according to another structure of the sixth embodiment of the present invention.
Figure 27A:
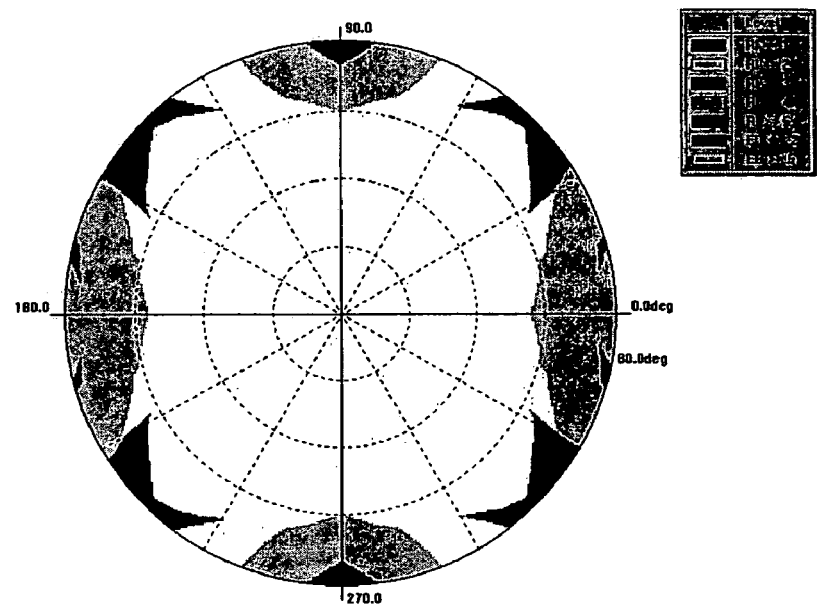
FIG. 27A, FIG. 27B, FIG. 28A to FIG. 28D illustrate viewing angle and gray inversion when using a general film in an LCD device according to the present invention.
Figure 27B:
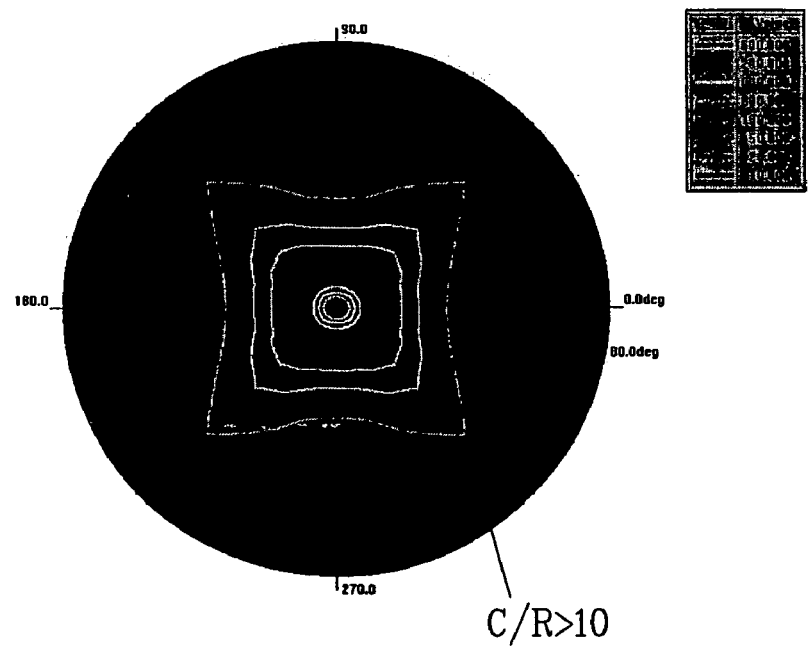
Figure 28A:
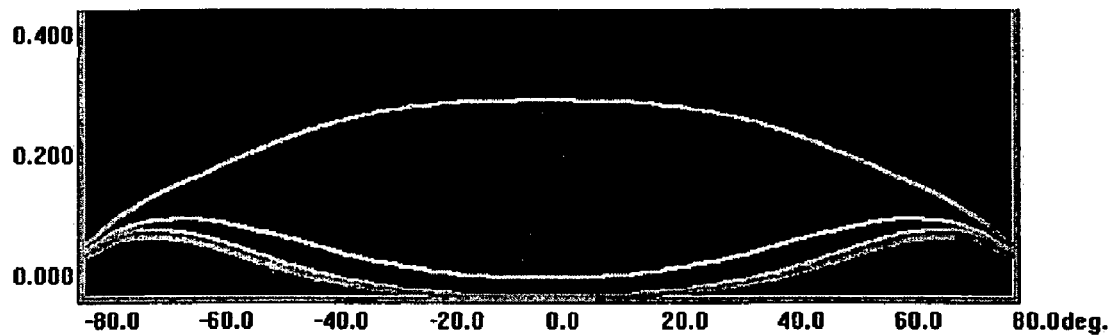
Figure 28B:
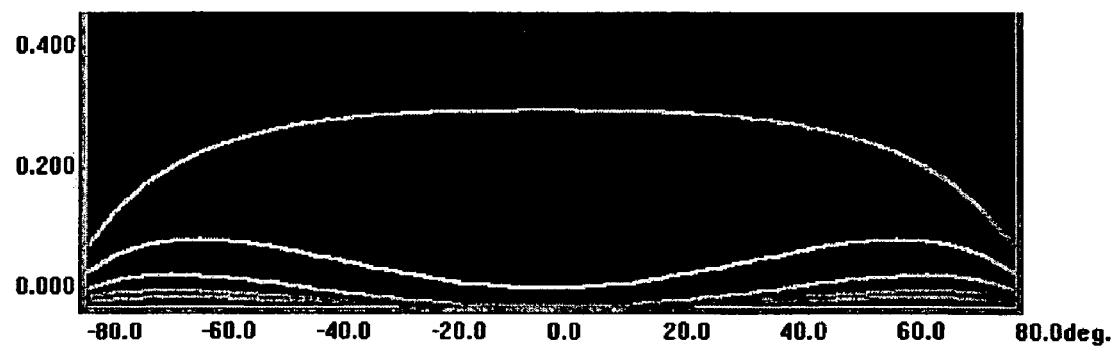
Figure 28C:
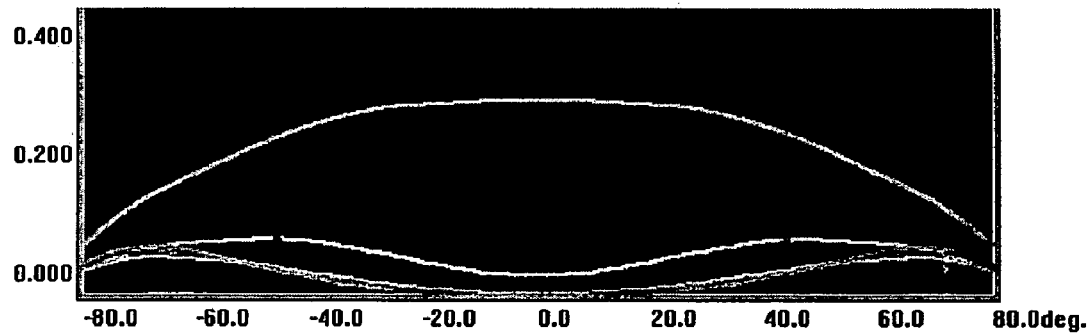
Figure 28D:
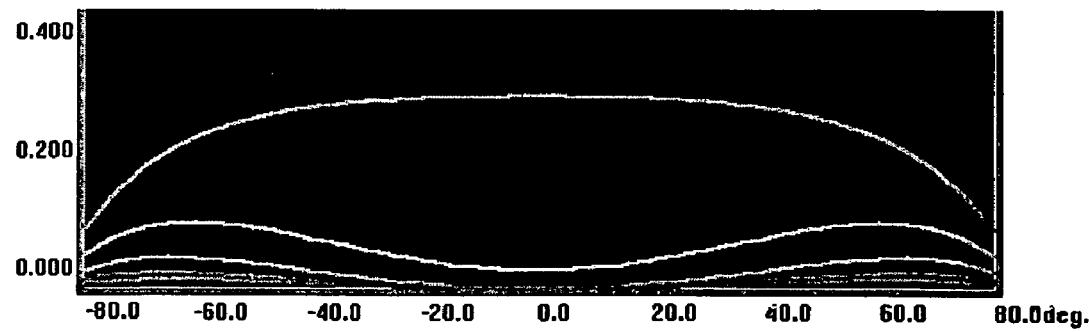
Figure 29A:
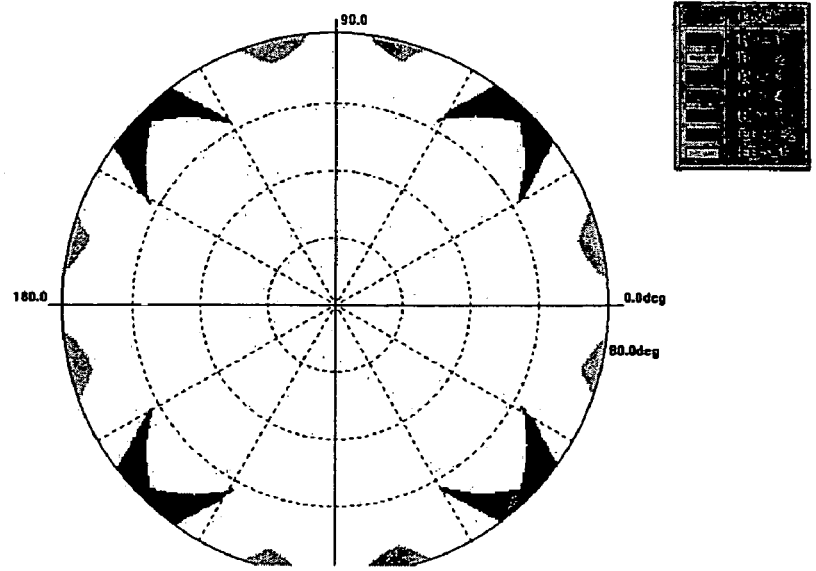
FIG. 29A, FIG. 29B, FIG. 30A to FIG. 30D illustrate viewing angle and gray inversion when using a negative compensation film in an LCD device according to the present invention.
Figure 29B:
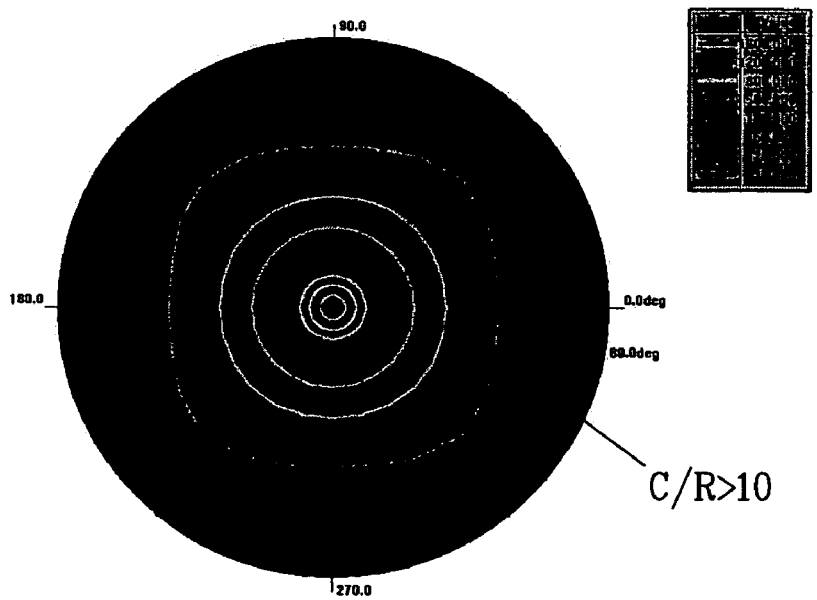
Figure 30A:
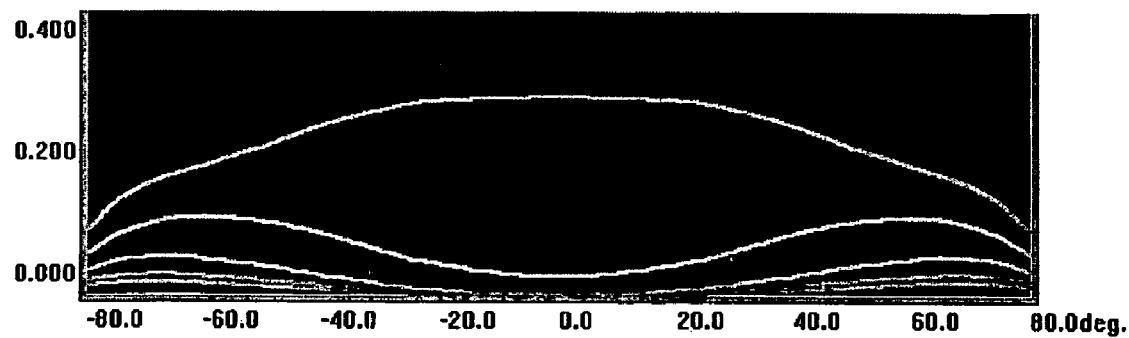
Figure 30B:
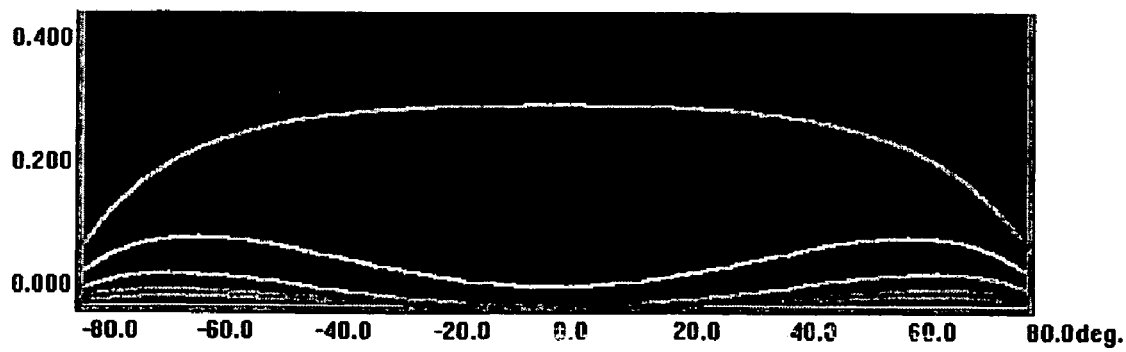
Figure 30C:
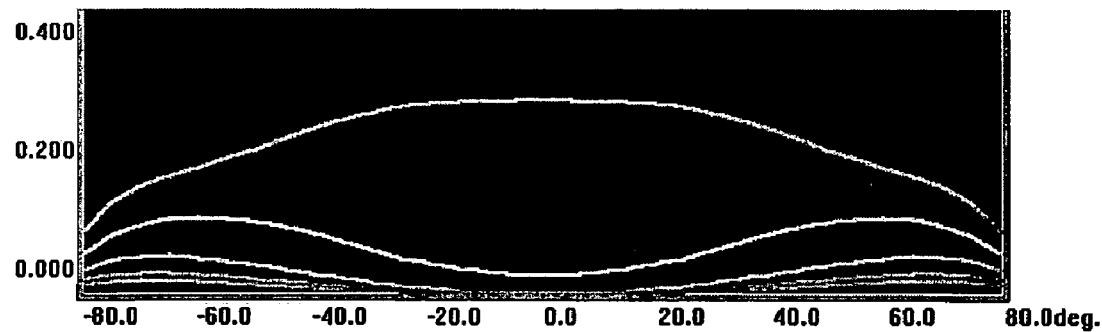
Figure 30D:
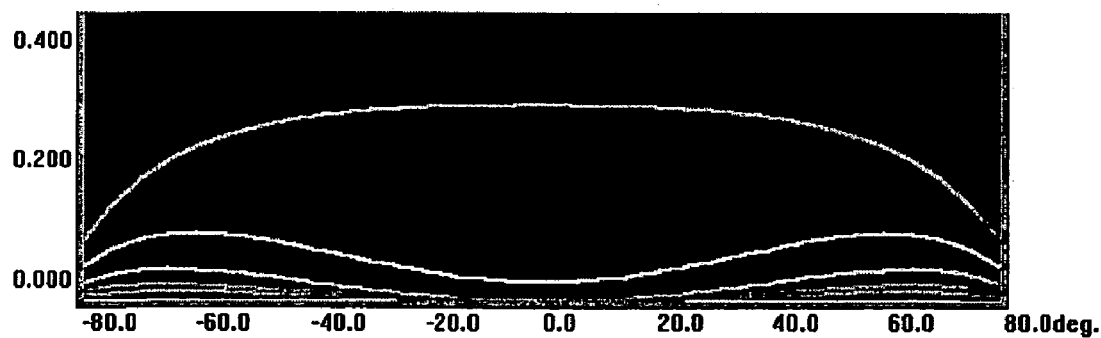

FIG. 24 is an enlarged plan view illustrating a unit pixel of an LCD device according to the sixth embodiment of the present invention. FIG. 25 is a cross-sectional view illustrating a unit pixel of an LCD device taken along line VII–VII' of FIG. 24 according to one structure of the sixth embodiment of the present invention. FIG. 26 is a cross-sectional view illustrating a unit pixel of an LCD device taken along line VII–VII' of FIG. 24 according to another structure of the sixth embodiment of the present invention.

In the LCD device according to the sixth embodiment of the present invention, as illustrated in FIG. 24 to FIG. 26, first and second dielectric protrusions are formed on an upper substrate corresponding to pixel electrodes in diagonal directions for not being parallel to each other, lower and upper substrates are respectively oriented at about 90° and about 0° to improve a viewing angle in all directions. Except for that difference, the LCD device according to the sixth embodiment of the present invention has the same structure as that of the LCD device according to the third embodiment of the present invention. That is, a common auxiliary electrode 135 is formed in the periphery of a pixel electrode 137, whereby an electric field outwardly faces. Thus, the rotation direction of the liquid crystal is generally correspondent to the direction of the electric field.

More particularly, a pretilt angle of an alignment layer is about 0°. Also, dopant is not added to the liquid crystal layer, whereby the liquid crystal is rotated at the same direction as the electric field. That is, the rotation direction of the liquid crystal is determined according to a voltage applied to the common auxiliary electrodes 135 because the dopant is not added to the liquid crystal layer. The dopant would influence the rotation direction of the liquid crystal.

Hereinafter, the rotation direction of the liquid crystal will be described in detail.

In the first domain of the pixel region, the direction of the electric field is in a direction of ten-thirty. In this state, when a voltage is applied to the common auxiliary electrode 135, the liquid crystal molecules that are substantially parallel to the lower and upper substrates become substantially perpendicular to the lower and upper substrates. At this time, the liquid crystal molecules are rotated counterclockwise from a direction of twelve o'clock, so that the liquid crystal molecules are generally arranged in a direction of ten-thirty.

In the second domain of the pixel region, the direction of the electric field is in a direction of four-thirty. In this state, when the voltage is applied to the common auxiliary electrode 135, the liquid crystal molecules that are substantially parallel to the lower and upper substrates become substantially perpendicular to the lower and upper substrates. At this time, the liquid crystal molecules are rotated counterclockwise from a direction of six o'clock, so that the liquid crystal molecules are generally arranged in a direction of four-thirty.

In the third domain of the pixel region, the direction of the electric field is in a direction of seven-thirty. In this state, when the voltage is applied to the common auxiliary electrode 135, the liquid crystal molecules that are substantially parallel to the lower and upper substrate become substantially perpendicular to the lower and upper substrates. At this time, the liquid crystal molecules are rotated clockwise from a direction of six o'clock, whereby the liquid crystal molecules are generally arranged in a direction of seven-thirty.

In the fourth domain of the pixel region, the direction of the electric field is in a direction of one-thirty. In this state, when the voltage is applied to the common auxiliary electrode 135, the liquid crystal molecules that are substantially parallel to the lower and upper substrates become substantially perpendicular to the lower and upper substrates. At this time, the liquid crystal molecules are rotated clockwise from a direction of twelve o'clock, whereby the liquid crystal molecules are generally arranged in a direction of one-thirty.

As mentioned above, the unit pixel region is divided into the four domains by the distortion of the electric field. Thus, phase difference of the light transmittance is compensated in the unit pixel region, thereby preventing gray inversion. Also, the viewing angle is symmetrical. The aforementioned structure has the aperture ratio of 70% or more as compared to a general TN mode LCD device.

In the LCD device according to the sixth embodiment of the present invention, as illustrated in FIG. 24, the direction of the liquid crystal molecules outwardly faces the periphery of the respective regions in the pixel region by the first and second dielectric protrusions 124a and 124b in the same direction as the electric field.

Simulation results of viewing angle and gray inversion when a general film and a negative compensation film are respectively used for a four-domain TN mode LCD device as the LCD devices according to the embodiments of the present invention, will be explained as follows.

FIG. 27A, FIG. 27B, FIG. 28A to FIG. 28D illustrate viewing angle and gray inversion characteristics when using a general film in an LCD device according to the present invention. FIG. 29A, FIG. 29B, FIG. 30A to FIG. 30D illustrate viewing angle and gray inversion characteristics when using a negative compensation film in an LCD device according to the present invention.

In case of the general film is used for the LCD device according to the present invention as illustrated in FIGS. 27A, 27B, 28A to FIG. 28D, the gray inversion is generated about 45° in lower and upper directions, and the gray inversion is not generated in remaining portions. In a portion where a contrast ratio C/R is 10 or more, the viewing angle is about 80° since the viewing angle is about 40° in respective lower and upper directions, and in respective left and right directions. When the rubbing direction is changed at 90° in the portion where the contrast ratio C/R is 10 or more, the viewing angle is about 160° since the viewing angle is about 80° in respective lower and upper, and in respective left and right directions.

Meanwhile, in case of that a compensation film having a negative refractive anisotropy, as illustrated in FIG. 29A, FIG. 29B, FIG. 30A to FIG. 30D, the gray inversion is not generated in the whole region. Also, in the portion where the contrast ratio C/R is 10 or more, the viewing angle is about 120° or more since the viewing angle is about 60° or more in respective lower and upper directions, and in respective left and right directions. The aforementioned compensation film may be a uniaxial or biaxial film. When the rubbing direction is changed at 90°, the viewing angle is rotated at 90°. That is, in the portion where the contrast ratio is 10 or more, the viewing angle is about 180° since the viewing angle is about 90° in respective lower and upper directions, and in respective left and right directions.

As mentioned above, the LCD device according to the present invention has the following advantages.

First, the unit pixel region is divided into the multi-domains, whereby the wide viewing angle is obtained. Also, the multi-domains are obtained according to the distortion of the electric field, thereby compensating the phase difference by the light transmittance. As a result, it is possible to prevent the gray inversion from being generated. When forming the multi-domains by the distortion of the electric field, the liquid crystal molecules inwardly or outwardly faces in the symmetrical structure, whereby the symmetrical viewing angle is obtained.

Furthermore, the unit pixel region is divided into the four or eight domains, so that the electric field intensity has a uniform influence on the whole region of the pixel region, thereby stably arranging the liquid crystal molecules.

When the first and second electric field inducing windows are diagonally formed in the pixel region, the lower substrate is aligned or rubbed at 90°, and the upper substrate is aligned or rubbed at 0°, the viewing angle is improved in all directions.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device, comprising:
   first and second substrates;
   gate and data lines crossing each other on the first substrate to define a pixel region;
   a common electrode on the second substrate;
   a pixel electrode in the pixel region;
   a dielectric protrusion on the common electrode corresponding to the periphery of the pixel electrode and having a portion completely crossing the pixel region, the dielectric protrusion crossing the pixel region dividing the pixel region into at least two regions, wherein the common electrode completely surrounds the pixel electrode;
   electric field inducing windows in the pixel electrode in respective ones of the regions of the pixel region;
   a common auxiliary electrode overlapping the electric field inducing windows of the pixel electrode; and
   a liquid crystal layer between the first and second substrates.

2. The device of claim 1, wherein the liquid crystal layer is undoped.

3. The device of claim 1, wherein the dielectric protrusion has a plurality of portions crossing the pixel region such that the pixel region has at least four regions, and wherein the electric field inducing windows are located in respective ones of the at least four regions, wherein two of the electric field inducing windows are substantially parallel to the gate line and two of the electric field inducing windows are substantially perpendicular to the gate line.

4. The device of claim 1, wherein one of the electric field inducing windows is substantially parallel to the gate line and another of the electric field inducing windows is substantially perpendicular to the gate line.

5. The device of claim 4, wherein the pixel region has a splay alignment.

6. The device of claim 1, wherein the electric field inducing windows are diagonally formed in the regions of the pixel region not to be parallel with each other.

7. The device of claim 6, wherein the first substrate includes a first alignment direction of about 0°, and the second substrate has a second alignment direction of about 90°.

8. The device of claim 1, wherein an elastic coefficient of the liquid crystal layer is greater at about 10% as compared with that of a liquid crystal having a positive dielectric anisotropy.

9. The device of claim 1, further comprising first and second alignment layers on the first and second substrates, the first and second alignment layers having a pretilt angle of about 1° or less.

10. The device of claim 1, wherein the common auxiliary electrode is at the same layer as the gate.

11. The device of claim 1, wherein the common auxiliary electrode is in the same layer as the data line.

12. The device of claim 1, wherein the dielectric protrusion overlaps a portion of the pixel electrode.

13. The device of claim 1, further comprising a passivation layer below the pixel electrode.

14. The device of claim 13, wherein the passivation layer is formed of one of Benzocyclobutene (BCB) or photoacryl.

15. The device of claim 1, wherein an additional electric field inducing window is formed in the common electrode.

16. The device of claim 1, further comprising additional dielectric protrusions on the second substrate corresponding to the electric field inducing windows.

17. A liquid crystal display device (LCD), comprising:

a first substrate and a second substrate;

a plurality of gate lines and a plurality of data lines disposed on the first substrate, wherein the plurality of gate lines cross the plurality of data lines to define a plurality of pixel regions;

a common electrode disposed on the second substrate;

a pixel electrode disposed in each of the plurality of pixel regions;

a window for inducing an electric field, wherein the window is disposed on the common electrode corresponding to a periphery of the pixel electrode and has a crossing portion crossing the pixel region, and wherein the crossing portion of the window is parallel to the plurality of gate lines and divides the pixel region into at least two sub-regions;

an additional window for inducing an electric field, wherein the additional window is disposed in the pixel electrode corresponding to one of the sub-regions;

a common auxiliary electrode corresponding to the additional window for inducing an electric field; and a liquid crystal layer disposed between the first and second substrates.

* * * * *